(12) United States Patent
Yu et al.

(10) Patent No.: US 12,099,367 B2
(45) Date of Patent: Sep. 24, 2024

(54) POOL CLEANER HAVING OBSTACLE DETECTING DEVICE

(71) Applicant: WYBOTICS Co., LTD., Tianjin (CN)

(72) Inventors: Qian Yu, Tianjin (CN); Pu Cen, Tianjin (CN); Jiancheng Huang, Tianjin (CN); Yueming Wang, Tianjin (CN); Shouqiang Guan, Tianjin (CN); Zilong Zhang, Tianjin (CN)

(73) Assignee: WYBOTICS Co., LTD., Tianjin (CN)

( * ) Notice: Subject to any disclaimer, the term of this patent is extended or adjusted under 35 U.S.C. 154(b) by 575 days.

(21) Appl. No.: 16/747,489

(22) Filed: Jan. 20, 2020

(65) Prior Publication Data

US 2020/0150679 A1     May 14, 2020

Related U.S. Application Data

(63) Continuation-in-part of application No. PCT/CN2019/079669, filed on Mar. 26, 2019.

(30) Foreign Application Priority Data

Apr. 28, 2018 (CN) .......................... 201810397918.2

(51) Int. Cl.
   G05D 1/00         (2024.01)
   E04H 4/16         (2006.01)

(52) U.S. Cl.
   CPC ......... *G05D 1/0259* (2013.01); *E04H 4/1654* (2013.01)

(58) Field of Classification Search
CPC .......... G05D 1/0259; G05D 2201/0203; E04H 4/1654; E04H 4/1663; E04H 4/16; G01V 3/08; G01V 8/10
See application file for complete search history.

(56) References Cited

U.S. PATENT DOCUMENTS

2011/0088725 A1*   4/2011   Bruneel ................ E04H 4/1663
                                                                                                                                 134/18
2011/0258789 A1   10/2011   Lavabre
(Continued)

FOREIGN PATENT DOCUMENTS

CN           1530509 A   *   9/2004
CN       201250528 Y       6/2009
(Continued)

OTHER PUBLICATIONS

English Translation of Cao (CN-105772470-A).*
(Continued)

*Primary Examiner* — Jess Whittington
*Assistant Examiner* — Shahira Baajour
(74) *Attorney, Agent, or Firm* — Bayramoglu Law Offices LLC

(57) ABSTRACT

An obstacle touching detecting device for a swimming pool cleaner includes a main functional portion of the cleaner and a sensor obstacle touching detecting device. The main functional portion of the cleaner includes a cleaner main body, a controller module, and a power-driven actuating device. The controller module and the power-driven actuating device are connected to the cleaner main body. The sensor obstacle touching detecting device includes a trigger unit connected to the cleaner main body and a sensor detecting module electrically connected to the controller module. The controller module is electrically connected to the power-driven actuating device. The trigger unit works collaboratively with the sensor detecting module to trigger the sensor detecting module to generate a detection signal. An automatic detection is performed when the cleaner touches the wall or other obstacles, and the cleaner is controlled to change direction automatically.

20 Claims, 18 Drawing Sheets

(56) References Cited

U.S. PATENT DOCUMENTS

2012/0103365 A1* 5/2012 Sumonthee .......... E04H 4/1654
134/18
2012/0279001 A1* 11/2012 Fu ........................ E04H 4/1654
416/147

FOREIGN PATENT DOCUMENTS

| CN | 101481957 | A | * | 7/2009 | .......... E04H 4/1654 |
| CN | 101028183 | B |   | 11/2010 | |
| CN | 103122700 | A | * | 5/2013 | |
| CN | 204532413 | U | * | 8/2015 | |
| CN | 105455732 | A | * | 4/2016 | .............. A47L 9/02 |
| CN | 105772470 | A | * | 7/2016 | |
| CN | 106970625 | A |   | 7/2017 | |
| CN | 107923191 | A | * | 4/2018 | ............ B63H 11/04 |
| KR | 100405331 | B1 |   | 11/2003 | |
| KR | 100576315 | B1 |   | 5/2006 | |
| KR | 2019084054 | A | * | 7/2019 | ............ G01J 1/0411 |

OTHER PUBLICATIONS

English Translation of Fu (CN-101481957-A).*
English Translation of CN-107923191-A.*
English Translation of CN-103122700-A.*
English Translation of CN-204532413-U.*
English Translation of KR-2019084054-A.*
English Translation of CN-1530509-A.*
English Translation of KR100405331B1 (Year: 2023).*
English Translation of CN 105455732 A (Year: 2024).*
English Translation of CN101028183A (Year: 2024).*

* cited by examiner

POOL CLEANER HAVING OBSTACLE DETECTING DEVICE

CROSS REFERENCE TO THE RELATED APPLICATIONS

This application is the continuation-in-part application of International Application No. PCT/CN2019/079669, filed on Mar. 26, 2019, which is based upon and claims priority to Chinese Patent Application No. 201810397918.2, filed on Apr. 28, 2018, the entire contents of which are incorporated herein by reference.

TECHNICAL FIELD

The present disclosure belongs to the technical field of swimming pool cleaning equipment, and in particular relates to an obstacle touching detecting device of a swimming pool cleaner.

BACKGROUND

Swimming pool is a place where people can swim, do exercise, or hold a competition. Most swimming pools are built on the ground. Considering the water temperature, there are two types of swimming pools, common swimming pools and heated swimming pools. In foreign countries, private swimming pools are more common, while in China, public swimming pools dominate. Whether private swimming pool or public swimming pool, the debris and rubbish are likely to be collected in the pool over time, so the swimming pools need to be cleaned regularly. Currently, the swimming pools are often cleaned by a swimming pool cleaner. The turning of the automatic cleaner for swimming pool cleaning is generally controlled according to time. The swimming pool cleaner is not able to return or turn away by recognizing the wall or obstacles. When the cleaner touches the wall or other obstacles, it must wait until the end of the set time period to reverse. Therefore, when meeting the pool wall or other obstacles, the cleaner is often struggling to go against the wall or obstacles without any movement for a long period of time before it can move in the opposite direction to clean other places, resulting in a low efficiency.

SUMMARY

Given the problems above, the technical problem to be solved by the present disclosure is to provide an obstacle touching detecting device for a swimming pool cleaner, which is particularly appropriate for the application of swimming pool cleaning and clear up. According to the presented disclosure, a sensor is employed to perform the obstacle touching detection of the cleaner, which allows the cleaner to change the direction automatically. Thus, the cleaner of the present disclosure is simple and convenient to use with high work efficiency.

In order to solve the above technical problems, the technical solution proposed by the present disclosure is an obstacle touching detecting device of a swimming pool cleaner. The obstacle touching detecting device of the swimming pool cleaner is disposed in a main functional portion of the cleaner, and the main functional portion of the cleaner includes a cleaner main body, a controller module, and a power-driven actuating device. The controller module and the power-driven actuating device are connected to the cleaner main body. The obstacle touching detecting device of the swimming pool cleaner further includes a sensor obstacle touching detecting device. The sensor obstacle touching detecting device includes a trigger unit and a sensor detecting module. The trigger unit is connected to the cleaner main body. The sensor detecting module is electrically connected to the controller module. The controller module is electrically connected to the power-driven actuating device. The trigger unit cooperates with the sensor detecting module to trigger the sensor detecting module to generate a detection signal.

Further, the trigger unit includes a trigger device having a trigger portion, and the trigger device having the trigger portion is connected to the cleaner main body. The trigger portion moves relative to the cleaner main body. The position of the sensor detecting module is matched with the positions of the feature points of the motion path of the trigger portion. Preferably, the trigger portion reciprocates relative to the cleaner main body. Preferably, the positions of the feature points of the motion path of the trigger portion include the initial position of the motion path and the position of the turning point. Preferably, the position of the sensor detecting module is matched with the initial position or the position of the turning point of the motion path of the trigger portion. Preferably, at least one sensor detecting module is provided.

Further, the trigger portion is a magnetic portion, and the magnetic portion is a substance or device capable of generating a magnetic field. Preferably, the magnetic portion is a magnet.

Further, the sensor detecting module is a Hall sensor.

Further, the trigger portion is an optical component, and the optical component is a retroreflector or a shade plate.

Further, the sensor detecting module is a photoelectric sensor.

Further, at least one trigger device is provided. The trigger device is provided with a buoyancy chamber, or the whole trigger device or a part of the trigger device is integrally formed by a buoyant material. Preferably, the buoyancy chamber is internally provided with buoyant material or air in closed condition.

Further, at least one trigger device is provided. The trigger device is provided with a heavy block or the whole trigger device or a part of the trigger device is integrally formed by a heavy material.

Further, at least one trigger device is provided. The trigger device is provided with an elastic member or the whole trigger device or a part of the trigger device is integrally formed by an elastic material. Preferably, the elastic member is a spring.

Further, the trigger device includes at least one resistance plate.

The advantages and positive effects of the present disclosure are as follows.

1. By adopting the above technical solution, the swimming pool cleaner has a more compact structure and can automatically detect when the cleaner touches the wall or other obstacles with the obstacle touching detecting device. Also, the cleaner is controlled to change the direction automatically, so the cleaner can change the direction automatically when meeting the wall or an obstacle. The cleaner of the present disclosure is simple and compact in structure, flexible in movement, and capable of cleaning the swimming pool independently and efficiently.

2. The swimming pool cleaner has an obstacle touching detecting device, which is capable of detecting whether an obstacle is met when the cleaner is performing the cleaning work, and automatically changing the moving direction. The obstacle touching detecting device detects the behaviors with a sensor and controls the running status of the motor of the cleaner through the controller module. For example, the running status of the motor may include rotating in a forward direction, stop, or rotating in a reverse direction. Hence, the moving direction of the cleaner can be changed. The cleaner is enabled to accurately detect whether or not an obstacle is met and change the direction of the cleaner when cleaning the swimming pool. Thus, the operation of the cleaner is more flexible and the efficiency loss caused by controlling according to time can be avoided. The present disclosure is especially useful for the battery-powered swimming pool cleaner.

3. The obstacle touching detecting device is the Hall sensor and a trigger device having a magnetic portion for working collaboratively with the Hall sensor is provided. In this way, the obstacle touching detecting device can quickly detect the obstacle touching behavior of the cleaner. The present disclosure is simple in structure, rapid in response, accurate, flexible in motion, and can meet the needs of use.

4. The obstacle touching detecting device is a photoelectric sensor and is provided with the trigger device having the optical component for working collaboratively with the photoelectric sensor, which enables the obstacle touching detecting device to quickly detect the obstacle touching behavior of the cleaner. The present disclosure is simple in structure, rapid in response, accurate, flexible in motion, and can meet the needs of use.

Figure 1:
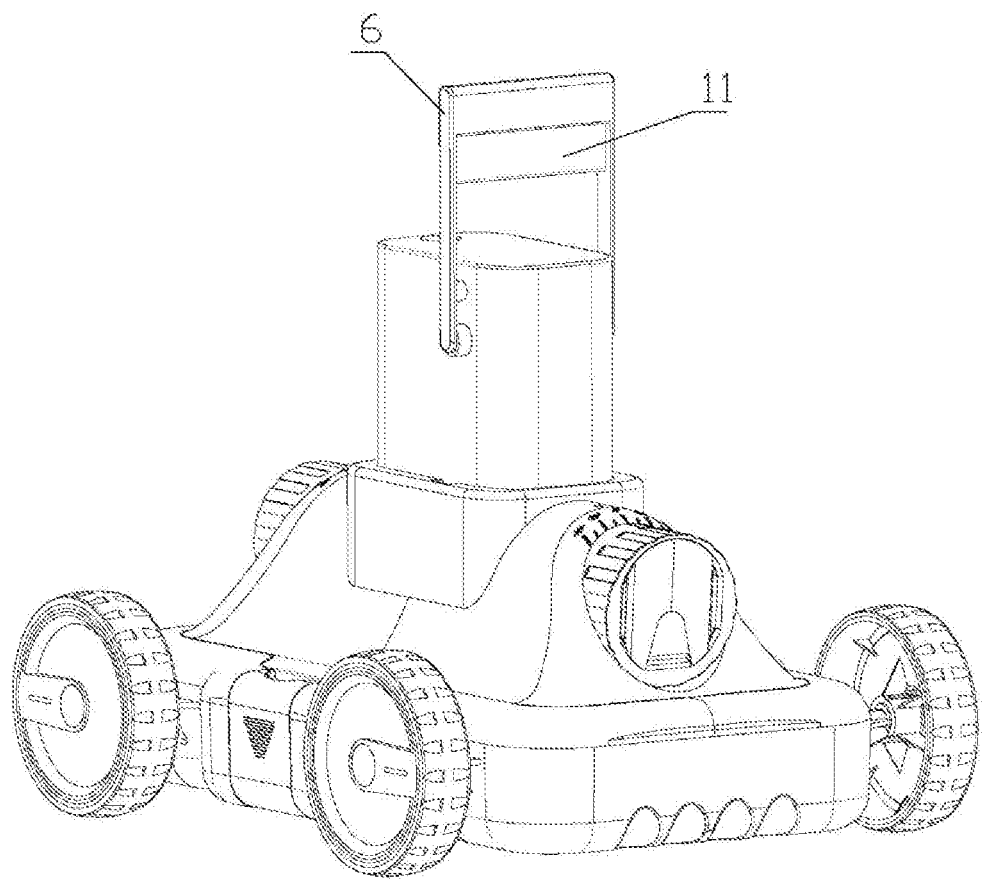
FIG. 1 is a structural schematic diagram of Embodiment 1 of the present invention.

In the figures:
1. Cleaner main body
2. Controller module
3. Magnet
4. Sensor detecting module
5. Pivoting shaft
6. Trigger device
7. Buoyancy chamber
8. Heavy block
9. Elastic member
10. Circuit board
11. Resistance plate
12. Connecting rod
3-1. Magnet
3-2. Magnet
4-1. Hall sensor
4-2. Hall sensor
4-3. Hall sensor
9-1. Elastic member
9-2. Elastic member
11-1. Resistance plate
11-2. Resistance plate
12-1. Connecting rod
12-2. Connecting rod
13-1. Guide column
13-2. Guide column
14-1. Slide way
14-2. Slide way
15-1. Support frame
15-2. Support frame
16. Mounting bushing
17. Retro-reflective photoelectric sensor
18. Retroreflector
19. Sealing plate
20. Through-beam photoelectric sensor emitter element
21. Through-beam photoelectric sensor receiver element
22. Shade plate

DETAILED DESCRIPTION OF THE EMBODIMENTS

The present disclosure will be further described below in conjunction with the drawings and specific embodiments.

FIG. 1 to FIG. 14 show the structural schematic diagrams of various embodiments of the present disclosure, where the structures of the embodiments are embodied. The obstacle touching detecting device of the swimming pool cleaner according to the present disclosure is used for detecting the obstacle touching behavior of the cleaner by the sensor obstacle touching detecting device when the swimming pool cleaner is doing the cleaning work. When meeting the pool wall during moving and cleaning, the obstacle touching detection is triggered and the sensor obstacle touching detecting device transmits the obstacle touching signal to the controller module. The controller module controls the power-driven actuating device to operate, and then the cleaner changes direction and continues the cleaning work. The sensor obstacle touching detecting device has a sensor detecting module for detecting a signal when meeting the pool wall or other obstacles, and the sensor detecting module is used for detecting and transmitting the obstacle touching signal. The sensor detecting module is a magnetic field sensor or a photoelectric sensor for detecting a magnetic field signal or an optical signal when meeting the wall to determine whether the swimming pool cleaner touches the wall or not.

Embodiment 1

Figure 2:
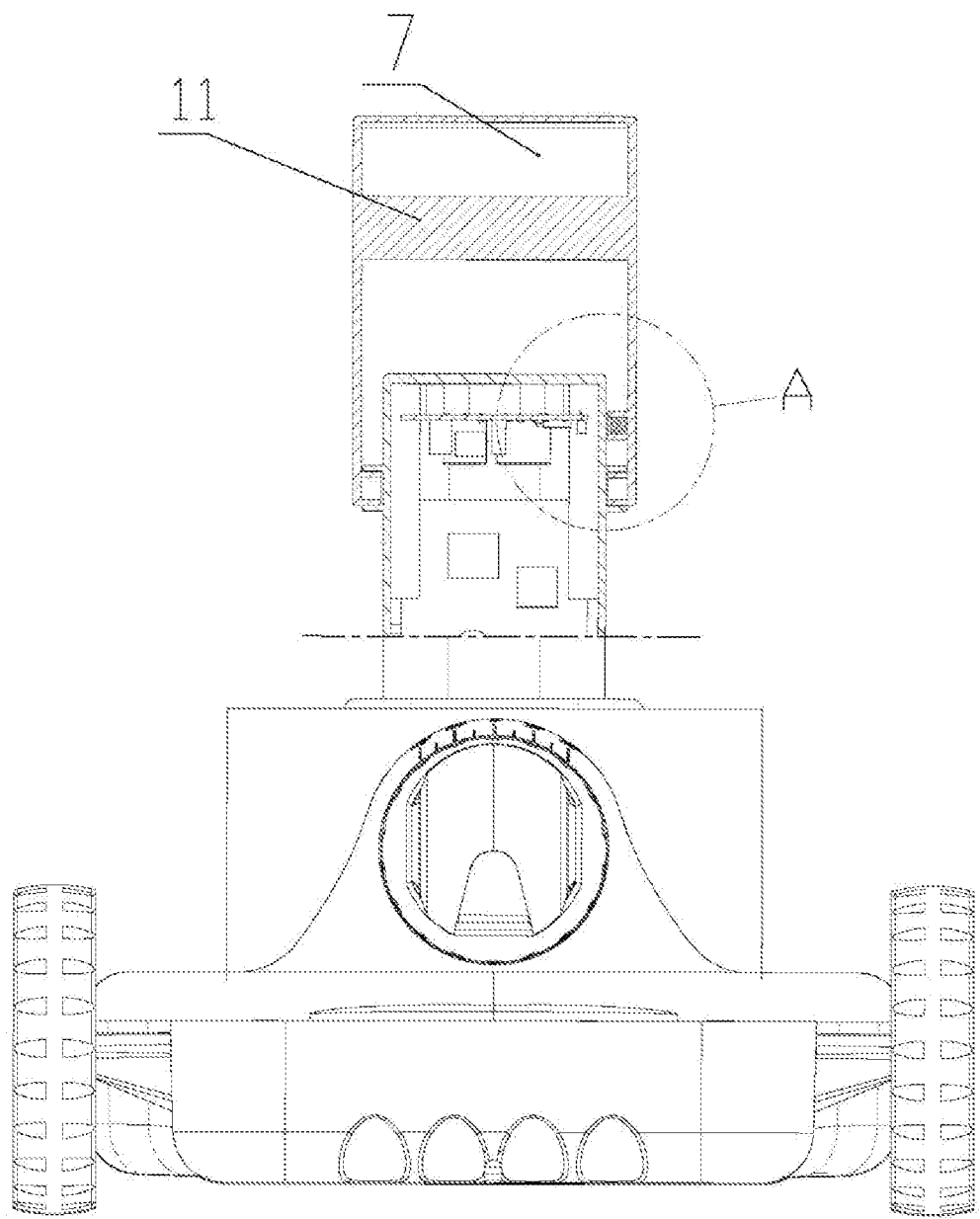
FIG. 2 is a partial cross-sectional view showing the structure of Embodiment 1 of the present disclosure.
Figure 3:
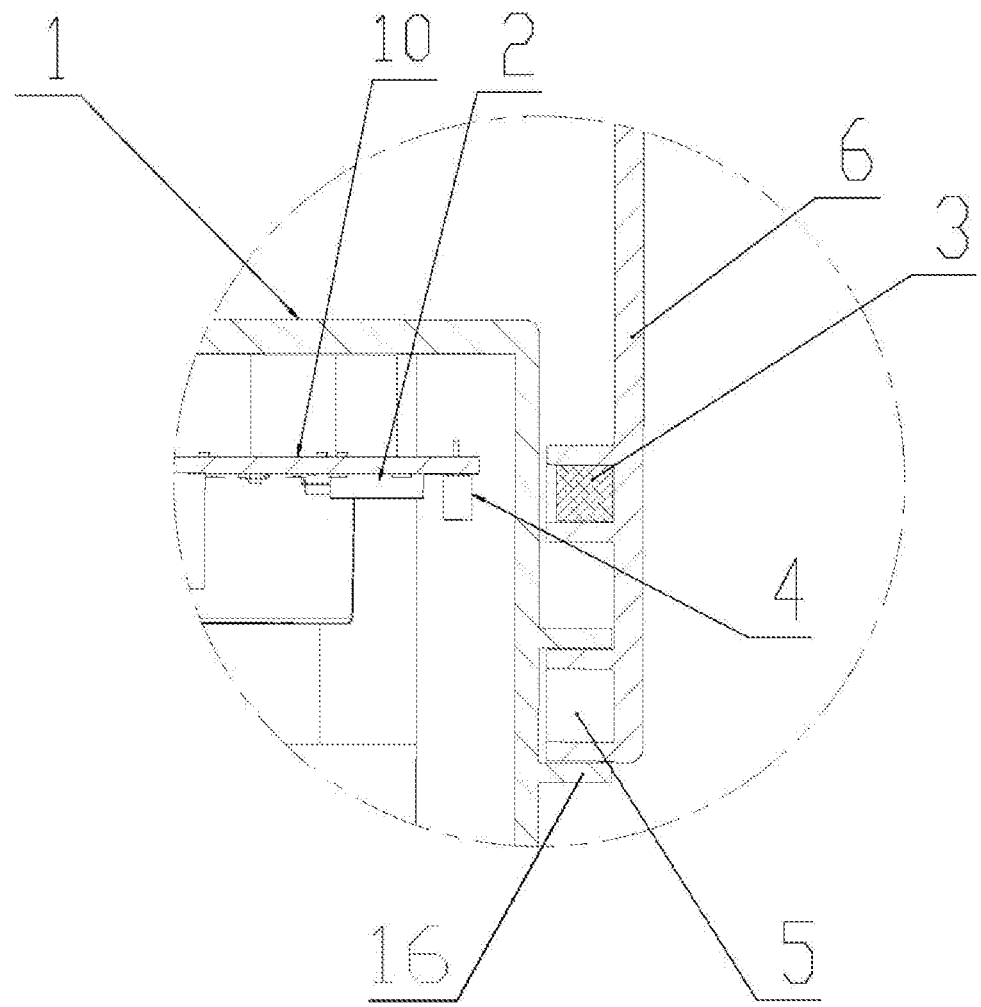
FIG. 3 is a partially enlarged view of part A in FIG. 2.

FIG. 1, FIG. 2 and FIG. 3 are structural schematic diagrams of an embodiment of the present disclosure, where the structure of the present embodiment is embodied. This embodiment relates to the obstacle touching detecting device of the swimming pool cleaner. In this embodiment, the obstacle touching detecting device of the swimming pool cleaner employs the sensor obstacle touching detecting device for obstacle touching detection, so that when meeting the pool wall in cleaning process, the cleaner can quickly determine whether the cleaner touches the pool wall or not. The sensor obstacle touching detecting device transmits the obstacle touching signal to the controller module 2, and the controller module 2 controls the power-driven actuating device of the cleaner to operate according to the wall touching signal, so that the cleaner would be able to change the moving direction and travel to and from to have the cleaning work of the swimming pool done by the cleaner. The sensor detecting module is a magnetic field sensor which detects a magnetic field signal when touches the wall to determine whether the swimming pool cleaner touches the wall or not.

Specifically, the above obstacle touching detecting device of the swimming pool cleaner includes a cleaner main functional portion and a sensor obstacle touching detecting device connected to the main functional portion. The cleaner main functional portion includes a cleaner main body 1, a controller module 2, and a power-driven actuating device. The controller module 2 and the power-driven actuating device are connected to the cleaner main body 1. The controller module 2 is electrically connected to the power-driven actuating device, and the sensor obstacle touching detecting device is electrically connected to the controller module 2. The sensor obstacle touching detecting device transmits the obstacle touching signal to the controller module 2, and the controller module 2 analyzes and judges the obstacle touching signal, then the controller module 2 controls the power-driven actuating device to act, so as to change the moving direction of the cleaner. The controller module 2 and the power-driven actuating device can be fixedly mounted inside the cleaner main body 1. Alternatively, the controller module 2 and the power-driven actuating device can also be arranged outside the cleaner main body 1 and connected to the cleaner main body 1 through cables, water pipes, or equivalent devices. The configuration could be selected according to practical needs without restrictive requirements.

The power-driven actuating device is used to actuate the movement of the cleaner main body 1. By changing the motion of the power-driven actuating device, the moving direction of the cleaner can be changed, and the cleaner will move in a given direction so that the cleaner can automatically change the direction without the need of manual control.

According to the work principle of the swimming pool cleaner, as a further improvement, at least one sealing portion is provided on the cleaner main body 1 to facilitate the sealing of components requiring waterproofing such as electronic components or motors, etc. When the controller module 2 is installed inside the cleaner main body 1, the controller module 2 is also installed in the sealing portion to be sealed inside the sealing portion, so the controller module 2 is prevented from water and damages. The controller module 2 is a single chip microcomputer that is a commercially available product and can be selected according to practical needs. The controller module 2 is loaded with a written program beforehand to convert and analyze the wall touching signal detected by the sensor obstacle touching detecting device and determine whether the cleaner touches the wall or not. Then, the controller module 2 controls the power-driven actuating device to act according to the analysis result, thereby changing the moving direction of the cleaner. Here, the power-driven actuating device consists of a motor and an impeller assembly. Preferably, the power-driven actuating device is disposed inside the cleaner main body 1. The motor drives the impeller to cause the cleaner to eject water, thereby changing the moving direction of the cleaner.

As shown in FIG. 3, the above sensor obstacle touching detecting device includes a trigger unit and a sensor detecting module 4. The trigger unit is connected to the cleaner main body 1, and the sensor detecting module 4 is electrically connected to the controller module 2. Namely, the sensor obstacle touching detecting device is electrically connected to the controller module 2 through the sensor detecting module 4. When the swimming pool cleaner is meeting the wall, the trigger unit triggers the sensor detecting module 4 to operate, and the sensor detecting module 4 transmits the obstacle touching signal to the controller module 2. After the controller module 2 analyzes the obstacle touching signal, the power-driven actuating device is controlled to change the water ejecting direction, thereby changing the moving direction of the swimming pool cleaner to perform direction changed. Specifically, the trigger unit includes a trigger device 6 having a trigger portion. When the swimming pool cleaner stops moving when meeting the pool wall or other obstacles, the trigger portion on the trigger device 6 is located at a position corresponding to the sensor detecting module 4, thus the sensor detecting module 4 is triggered to transmit the obstacle touching signal to the controller module 2. Here, the trigger portion may be a magnetic portion, an optical component, or other types of signal triggering components, the selection depends on the type of the sensor detecting module. In this embodiment, preferably, the trigger portion is the magnetic portion, which may be a substance or device that can generate a magnetic field. The magnetic portion may be a local area integrally formed on the trigger device and subjected to magnetization processing, or an independent magnetic substance or device mounted on the trigger device 6. Preferably, in this embodiment, the magnetic portion is the magnet 3 mounted on the trigger device 6.

The sensor detecting module 4 is electrically connected to the controller module 2. The sensor detecting module 4 can be separately installed on the cleaner main body 1 and sealed separately, for example, mounted on the shell of the cleaner main body 1, or it can be mounted inside the cleaner main body 1. Preferably, the controller module 2 is disposed inside the cleaner main body 1, and the sensor detecting module 4 is disposed on the circuit board 10 where the controller module 2 is located. The controller module 2 and the sensor detecting module 4 are collectively sealed. In this embodiment, according to the above-mentioned preferred method, the sensor detecting module 4 is mounted on the circuit board 10 where the controller module 2 is located, and the sensor detecting module 4 is located in the same sealing portion of the cleaner main body 1 to facilitate sealing and transmitting the obstacle touching detection signal.

The trigger device 6 is mounted on the cleaner main body 1. Specifically, the trigger device 6 may be installed inside the cleaner main body 1 or outside the cleaner main body 1. The selection depends on practical needs without restrictive requirements here. When the trigger device 6 is mounted inside the cleaner main body 1, a front hole is provided on the front position of the cleaner main body 1 and another corresponding second hole which is dredging to the front hole is provided on the rear position of the cleaner main body 1 to make the trigger device 6 pivot or move back and forth against the water. In this embodiment, the trigger device 6 is mounted outside the cleaner main body 1. The trigger device 6 may be mounted on the cleaner main body 1 in various ways such as pivoting shaft or sliding rail, etc. The selection depends on practical needs. In this embodiment, the trigger device 6 is mounted on the cleaner main body 1 via pivoting shafts.

The pivoting shafts 5 are symmetrically mounted on two sides of the housing of the cleaner main body 1, and the trigger device 6 is mounted on the housing of the cleaner main body 1 via the pivoting shaft 5, so that the trigger device 6 can rotate about the center line of pivoting shaft 5 and pivot back and forth relative to cleaner main body 1. The mounting bushings 16 of the pivoting shafts 5 are symmetrically disposed on two sides of the housing of the cleaner main body 1. The pivoting shafts 5 are mounted in the mounting bushings 16, and the mounting bushings 16 fit the pivoting shafts 5 in shape. Moreover, the diameter of the pivoting shaft 5 is smaller than the inner diameter of the mounting bushing 16, so after the pivoting shaft 5 is mounted, there is a gap between the pivoting shaft 5 and the mounting bushing 16, which facilitates the installation and free movement of the trigger device 6.

Here, the trigger device 6 includes the resistance plate 11 of a plate-like structure and pivoting arms. The resistance plate 11 is connected to the pivoting arms by welding, mechanical connection, etc., or the resistance plate 11 and the pivoting arms are integrally formed.

The pivoting arms are disposed on two sides of the lower end of the resistance plate 11. The resistance plate 11 is connected to the pivoting shaft 5 through the pivoting arms on two sides. The mounting bushings 16 are symmetrically disposed on two sides of the housing of the cleaner main body 1, and the pivoting arms are connected to the mounting bushings 16 via the pivoting shafts 5, so that the resistance plate 11 is connected to the housing of the cleaner main body 1 through the pivoting shafts 5, and the resistance plate 11 can pivot freely. The pivoting shafts 5 and the pivoting arms can also be integrally formed, and the pivoting shafts 5 are mounted in the mounting bushings 16, so that the resistance plate 11 is directly mounted on the housing of the cleaner main body 1 through the pivoting arms. That is to say, the entire trigger device 6 is mounted on the housing of the cleaner main body 1 via the pivoting shafts 5 and can move back and forth relative to the cleaner main body 1. The resistance plate 11 and the pivoting shafts 5 may also be connected to one another by other methods which depends on the practical needs.

The trigger device 6 is provided with the buoyancy chamber 7 which enables the trigger device 6 to return to the initial position under the action of buoyancy. In this embodiment, preferably, the buoyancy chamber 7 is disposed on the resistance plate 11, and the substance placed in the buoyancy chamber 7 may be air in a closed condition or a buoyant material having a density smaller than that of the swimming pool water. When the cleaner stops moving in the swimming pool, the resistance plate 11 can return to the initial position owing to the buoyancy chamber 7. The initial position in this embodiment refers to the vertical position of the resistance plate 11. The buoyancy chamber 7 is disposed on the resistance plate 11 and integrally formed with the resistance plate 11, and the pivoting arms and the resistance plate 11 are also integrally formed. The buoyancy chamber 7, the pivoting arms, and the resistance plate 11 may be connected to one another in other ways or changed with relative positions according to practical needs. Alternatively, the overall structure of the non-magnetic portion of the trigger device 6 is integrally formed by a buoyant material having a density smaller than that of the swimming pool water, and it is not necessary to provide the buoyancy chamber, separately. Alternatively, a part of the non-magnetic portion of the trigger device is integrally formed by the buoyant material having a density smaller than that of the swimming pool water. Alternatively, the trigger device having the trigger portion is integrally formed by a composite material composed of a magnetic material and a buoyancy material having a density smaller than that of the swimming pool water. With the design mentioned above, the trigger device is able to reset under the action of the buoyancy in the swimming pool without the need of separately providing the buoyancy chamber, thereby further simplifying the structure of the trigger device while achieving the same effects.

Further, since the area of the resistance plate 11, the roughness or structure of the outer surface of the resistance plate 11, the buoyancy of the buoyancy chamber 7, and the moving speed of the cleaner in the swimming pool are related to the pivoting angle of the resistance plate 11 when moving in the swimming pool, the area of the resistance plate 11, the roughness or structure of the outer surface of the resistance plate 11, the buoyancy of the buoyancy chamber 7, and the moving speed of the cleaner in the swimming pool work collaboratively to make sure that when the cleaner moves at a certain speed in the swimming pool, the resistance plate 11 maintains a position of a constant pivoting angle against the joint action of the resistance of the water and the buoyancy of the buoyancy chamber 7. That is to say, when the cleaner is moving and cleaning the swimming pool, the resistance plate 11 pivots in the direction opposite to the moving direction under the resistance of the water, maintains at a position of a constant angle, and gets balanced without any movement, thereby maintaining the movement and the cleaning work of the cleaner in the swimming pool. Here, the trigger device 6 is basically made of plastic, or other materials may also be selected according to practical needs.

The trigger portion is provided on one of the pivoting arms on two sides of the resistance plate 11. Preferably, the trigger portion is a magnetic portion. The magnetic portion is a substance or device capable of generating a magnetic field. In this embodiment, preferably, the magnetic portion is the magnet 3, and the position of the magnet 3 matches the position of the sensor detecting module 4. That is to say, in the initial status of the resistance plate 11, namely, the vertical position, the magnet 3 and the sensor detecting module 4 are located on the same straight line, and the magnet 3 is at a position corresponding to the sensor detecting module 4.

The sensor detecting module 4 is a sensor. Here, the sensor detecting module 4 is a magnetic field sensor. Preferably, the magnetic field sensor is a Hall sensor. The Hall sensor works collaboratively with the magnet. According to the working principle of the Hall sensor, the Hall sensor can transmit a signal to the controller module 2 when meeting the wall. Specifically, the Hall sensor is a commercially available product which may be selected according to the practical needs.

In this embodiment, at least one sensor detecting modules is provided. Alternatively, multiple sensor detecting modules may also be provided. The number of the sensor detecting module may be selected according to the practical needs and the transmission mode of the obstacle touching detection signals. Whilst, the position of the sensor detecting module matches with the position of the trigger portion when the trigger device is in different statuses. The trigger portion moves relative to the cleaner main body. Here, preferably, the trigger portion reciprocates relative to the cleaner main body. The position of the sensor detecting module matches with the position of the feature point of the motion path of the trigger portion. The position of the feature point of the motion path of the trigger portion includes the initial position of the motion path and the position of the return point of the motion path. Preferably, the position of the sensor detecting module matches the initial position or the position of the return point of the motion path of the trigger portion.

Specifically, when one Hall sensor is provided, the Hall sensor is at a position corresponding to the magnet while the trigger device 6 is maintained in the initial status. In this embodiment, the initial status of the trigger device 6 is a vertical position in which the position of the magnet 3 is the initial position. When the cleaner starts to move and clean the swimming pool, the trigger device 6 moves in a direction opposite to the moving direction of the cleaner under the resistance of the water and maintains balanced. Namely, the pivoting angle between the trigger device 6 and the vertical direction is maintained without any movement. In other words, the trigger device 6 moves together with the magnet 3 to the return point and maintains balanced under the resistance of the water. When the cleaner arrives the position of the pool wall, the cleaner will continue to move until it touches the pool wall, then the speed of the cleaner jumps to zero, the resistance of the water decreases to zero, and the trigger device 6 returns to the vertical position under the action of the buoyancy chamber 7. At this time, the magnet is at the position corresponding to the Hall sensor. According to the working principle of the Hall sensor, at this time, the Hall sensor is turned on to send the signal to the controller module 2, and the controller module 2 controls the motor inside the cleaner main body 1 to operate according to the signal to change the water ejecting direction of the cleaner, thereby changing the moving direction of the cleaner. Subsequently, the trigger device 6 moves to the opposite side under the resistance of the water and maintains at a position of a constant pivoting angle relative to the vertical direction, that is, the trigger device 6 moves together with the magnet 3 until the cleaner arrives the return point at the other side and maintains balanced under the resistance of the water. When the cleaner touches the wall again, the above process is repeated, thereby achieving the function of cleaning the swimming pool by the cleaner. During this process, the trigger device 6 pivots back and forth in response to the change of the operation status of the cleaner main body 1 in the swimming pool, and the magnet 3 moves together with the entire trigger device between the two return points of its motion path while passing through the initial position of the magnet 3 and pivots back and forth. Therefore, the obstacle touching detection and recognition during the operation of the cleaner is realized, and the detection signal is generated. In other words, the trigger device 6 pivots back and forth in response to the change of the operation status of the cleaner main body 1 in the swimming pool, and the trigger portion reciprocates with the entire trigger device between the two return points of its motion path while passing through the initial position of the trigger portion.

Figure 8:
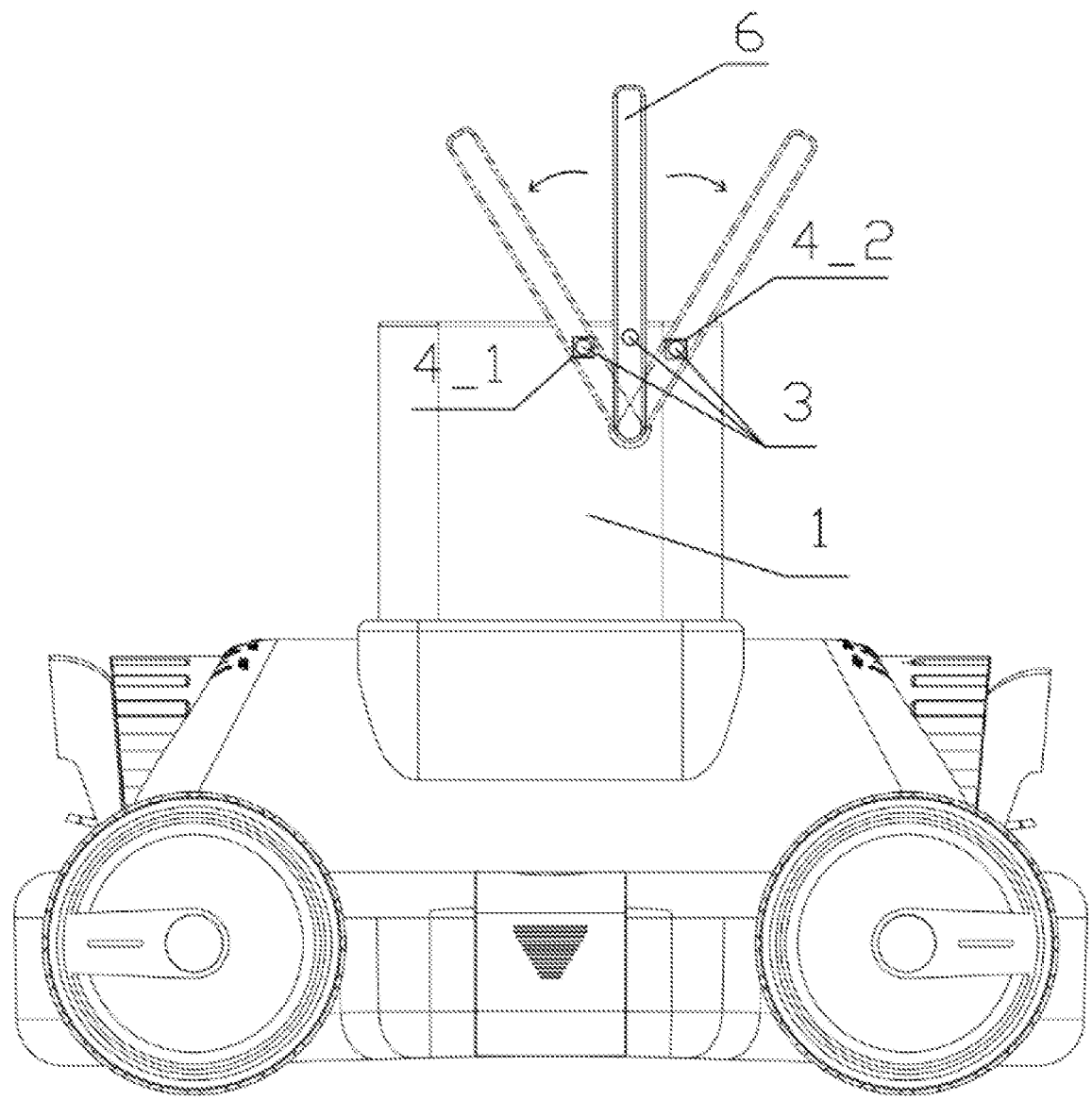
FIG. 8 is a schematic view showing the structure of two Hall sensors according to the present disclosure.

When two Hall sensors are provided, as shown in FIG. 8, combined with FIG. 2 and FIG. 3, the Hall sensor 4-1 and the Hall sensor 4-2 are symmetrically mounted on circuit board 10 where the controller module 2 is located, and the Hall sensor 4-1 and the Hall sensor 4-2 are located at positions corresponding to the magnets when the trigger device 6 moves to the farthest end (i.e., the return point). Here, the Hall sensor 4-1 and the Hall sensor 4-2 are located at positions corresponding to the magnets when the trigger device 6 moves to the position of maximum pivoting angle (i.e. return point) at either side of the vertical position of the trigger device 6. That is to say, at this time, the signals of the Hall sensor 4-1 and the Hall sensor 4-2 and the signal of the Hall sensor when only one Hall sensor is provided represent different meanings. When the cleaner moves in the swimming pool, the trigger device 6 pivots in the direction opposite to the moving direction under resistance of the water. When the trigger device 6 maintains at a position of a constant pivoting angle and keeps balanced, the circuit board 10 where the controller module 2 is located is mounted with a Hall sensor 4-1 at a position corresponding to the magnet on the trigger device 6. According to the working principle of the Hall sensor, at this time, the Hall sensor 4-1 is turned on to send the current signal to the controller module 2. The controller module 2 analyzes the signal and confirms that the cleaner does not touch the wall, so the controller inside the cleaner main body 1 will not operate, and the power-driven actuating device maintains the original status. As the cleaner keeps moving, and the Hall sensor 4-1 remains on. When the cleaner arrives and touches the pool wall, the moving speed of the cleaner jumps to zero, and the trigger device 6 returns to the vertical position under the action of the buoyancy chamber 7. At this time, the Hall sensor 4-1 moves away from the magnet, and the Hall sensor 4-1 generates an off signal. According to the off signal, the controller module 2 controls the power-driven actuating device inside the cleaner main body 1 to operate, and then the cleaner changes the water ejecting direction and thus changing the moving direction. After the cleaner changes its moving direction, the trigger device 6 pivots to the opposite side. When the trigger device 6 maintains at a position of a constant pivoting angle and keeps balanced, the circuit board 10 where the controller module 2 is located is provided with the Hall sensor 4-2 at the position corresponding to the magnet on the trigger device 6. According to the working principle of the Hall sensor, at this time, the Hall sensor 4-2 is turned on, and the controller module 2 analyzes the signal transmitted by the Hall sensor 4-2. Accordingly, the controller inside the cleaner main body 1 does not operate, the power-driven actuating device maintains the original status, and the cleaner continues to move in the same direction. When the cleaner touches the pool wall again, the walking speed again jumps to zero, and the trigger device 6 returns to the vertical position under the action of the buoyancy chamber 7. Thus, the Hall sensor 4-2 is turned off, the controller module 2 controls the power-driven actuating device to operate, and the water ejecting direction of the cleaner is changed, thereby changing the moving direction of the cleaner and achieving the reciprocating movement of the cleaner. Here, the Hall sensor 4-1 and the Hall sensor 4-2 are both mounted on the circuit board 10 where the controller module 2 is located and are symmetrically arranged about the vertical trigger device 6 to ensure automatic direction changing of the cleaner.

Figure 9:
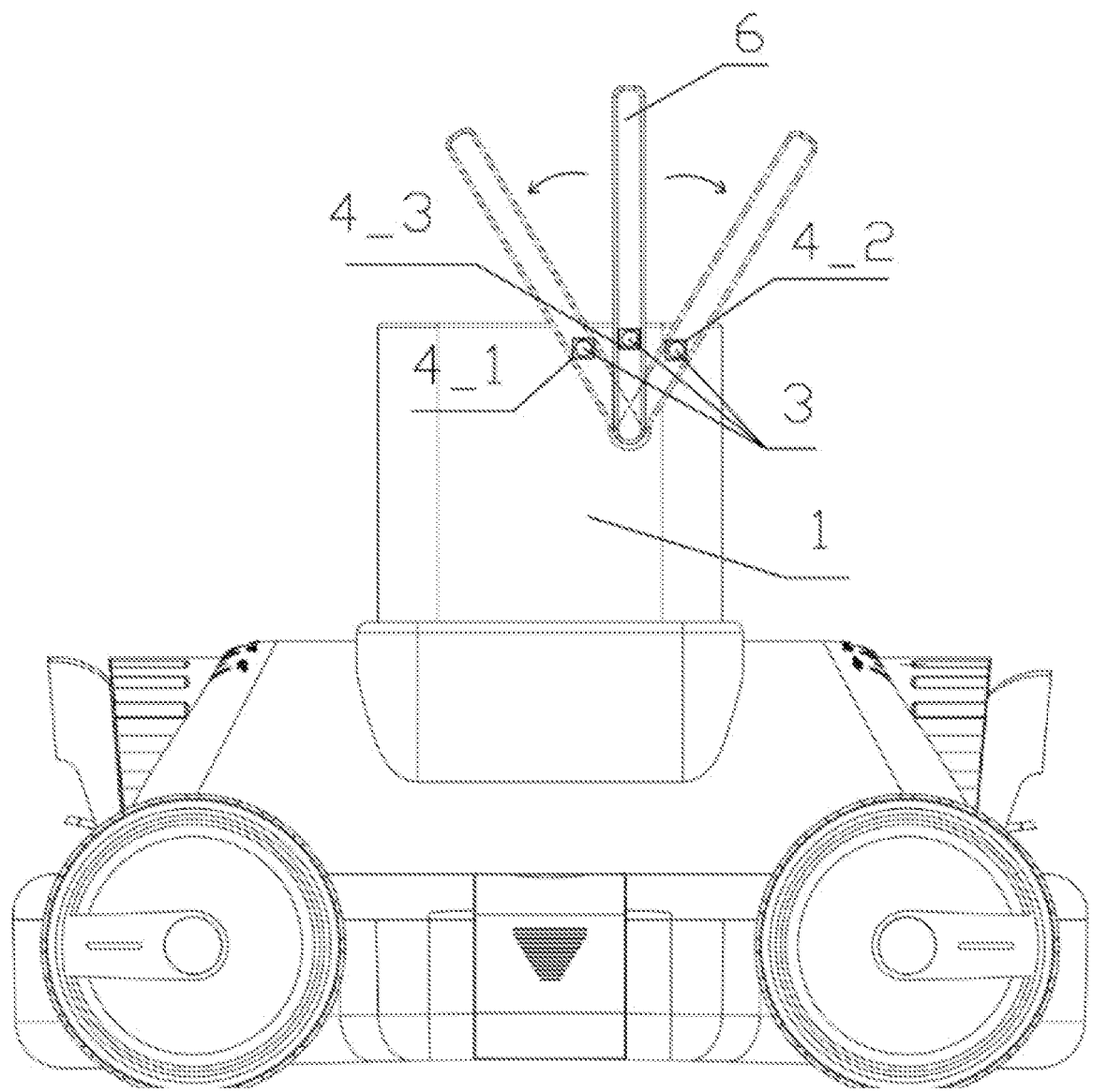
FIG. 9 is a schematic view showing the structure of three Hall sensors according to the present disclosure.

When three Hall sensors are provided, as shown in FIG. 9, combined with FIG. 2, FIG. 3 and FIG. 8, the two Hall sensors on two sides are the same as the Hall sensors of the above embodiment where two Hall sensors are provided. The difference is that when the resistance plate is kept in the vertical position, the circuit board 10 where the controller module 2 is located is mounted with the Hall sensor 4-3 at the position corresponding to the magnet on the trigger device 6 in this state. When the trigger device 6 is in the vertical position, the magnet is located at the position corresponding to the Hall sensor 4-3, so at this time the Hall sensor 4-3 is turned on. The Hall sensor 4-3 transmits the signal to the controller module 2, and the controller module 2 controls the power-driven actuating device to operate according to the current signal of the Hall sensor 4-3 to change the water ejecting direction of the cleaner, thereby changing the moving direction of the cleaner. The Hall sensor 4-1 and the Hall sensor 4-2 on two sides of the circuit board 10 are symmetrically arranged about the Hall sensor 4-3 at the middle.

That is to say, when two Hall sensors are provided, the controller module 2 operates to change the direction according to the off signals of the two Hall sensors. A position on the circuit board corresponding to each of the two end positions of the movement of the trigger device 6 is provided with a Hall sensor, and no Hall sensor is provided at the middle position. In this way, when the Hall sensor is on, the cleaner is considered to move in one direction. Otherwise, the cleaner is considered to touch the wall. When three Hall sensors are provided, the controller module 2 controls the power-driven actuating device to operate to change the moving direction of the cleaner according to the on signal of the Hall sensor in the middle position. The three Hall sensors are used to determine the status of the cleaner. When the Hall sensors at the two sides of the cleaner transmit on signals, it can be determined that the cleaner is moving in a certain direction. While, when the middle Hall sensor transmits an on signal, it is determined that the cleaner touches the wall.

The operation status of the cleaner may also be determined according to the combination of the signals from the plurality of Hall sensors. For example, when the Hall sensor at the middle and the Hall sensor at either of the two sides transmit on signals one after another, it can be determined that the cleaner is moving in a certain direction. In this case, the Hall sensors on two sides do not have to be provided at the positions corresponding to the magnet on the trigger device 6 at the return points of its motion path. For example, the Hall sensors may be disposed wherever appropriate between the initial position and the positions of the return points of the motion path of the magnet. When the trigger device 6 moves together with the magnet to pass by the Hall sensor, an on signal will be generated. More Hall sensors allows the cleaner to obtain more information about the operation status of the cleaner, and by using the information, the reliability of judgment can be improved or more operational controls can be performed.

In this embodiment, when one Hall sensor is provided, the working process is as follows. The cleaner is put into the water and started, ejecting water to push the cleaner to move forward, and the trigger device 6 moves backward. The magnet on the trigger device 6 gets out of the range of the Hall sensor, so the Hall sensor is turned off. When the cleaner touches the wall, the trigger device 6 returns to the initial position, the magnet on the trigger device 6 returns to the position near the Hall sensor, and the Hall sensor senses the magnetic field signal and is turned on. The cleaner ejects water in one opposite direction to push the cleaner to move backward, and the trigger device 6 moves to the direction opposite to the moving direction, so the Hall sensor is turned off again. Then, the cleaner moves away from the pool wall toward the pool wall at the opposite side. The cleaner repeats the above processes to change the direction when meeting the pool wall to achieve the reciprocating motion of the cleaner.

Embodiment 2

Figure 4:
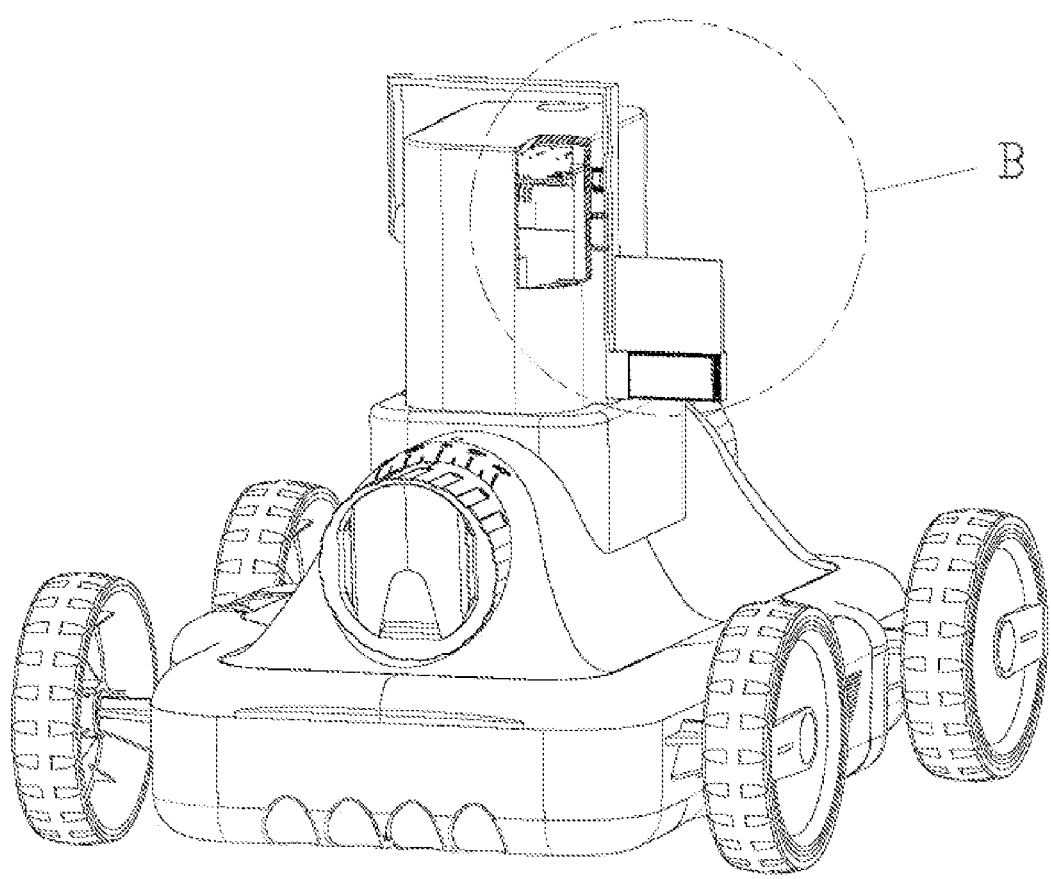
FIG. 4 is a partial cross-sectional view showing the structure of Embodiment 2 of the present invention.
Figure 5:
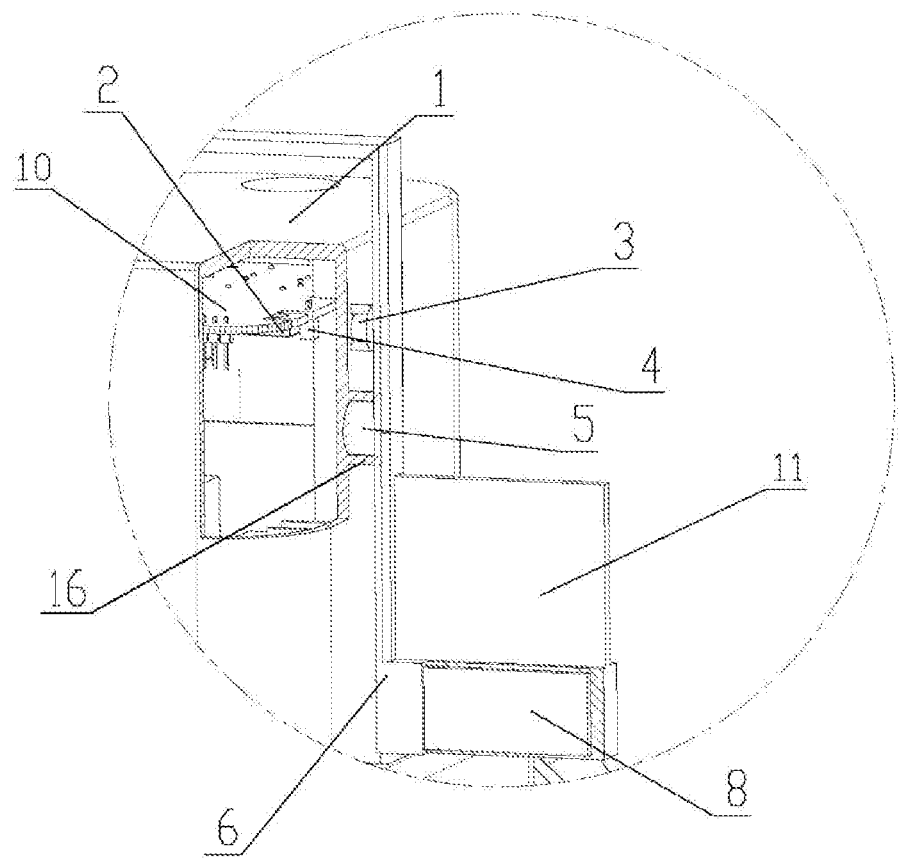
FIG. 5 is a partially enlarged view of part B in FIG. 4.

In the present embodiment, the obstacle touching detecting device of the swimming pool cleaner is similar to that of the embodiment 1 in structure. As shown in FIG. 4 and FIG. 5, the difference is that in the embodiment 1 the trigger device 6 is provided with the buoyancy chamber 7 and returns to the initial position under the action of the buoyancy. In this embodiment, the structure of the trigger device 6 is different from that of the embodiment 1, and the trigger device 6 returns to the initial position under the action of the gravity. In this embodiment, the trigger device 6 is mounted with a heavy block having a density greater than that of the swimming pool water to reset under the action of the gravity. The trigger device 6 includes at least one resistance plate 11 of plate-like shape and a pivoting arm. The resistance plate 11 is connected to the pivoting arm. The pivoting arm is connected to the pivoting shaft 5, so that the trigger device 6 is installed on the cleaner main body 1. The resistance plate 11 may be configured above or below the pivoting shaft 5 according to the practical needs. In this embodiment, the resistance plate 11 is located below the pivoting shaft 5. The heavy block is configured below the pivoting shaft 5, and may be installed at the upper or lower portion of the resistance plate 11. Alternatively, the heavy block may be mounted at the pivoting arm according to actual needs. Here, preferably, the heavy block 8 is mounted at the lower portion of the resistance plate 11. The size and surface structure of the resistance plate 11 and the weight of the heavy block 8 match with the moving speed of the cleaner. Thus, the trigger device 6 can pivot to the side opposite to the moving direction under the resistance of the water while the cleaner is moving. When meeting the pool wall, the cleaner touches the pool wall. At this time, the moving speed of the cleaner jumps to zero, and the trigger device 6 returns to the initial position under the action of gravity. Whilst, the magnet is located at a position corresponding to the Hall sensor, and the Hall sensor is turned on under the effect of the magnet to transmit the obstacle touching signal to the controller module 2. The controller module 2 controls the power-driven actuating device to operate to change the moving direction of the cleaner.

Further, the entire trigger device 6 or a part of the trigger device 6 may be integrally formed by a heavy material having a density greater than that of the swimming pool water, so there is no need to provide the heavy block on the trigger device 6 separately to complete the above actions.

The working process of this embodiment is as follows. The cleaner is first put into the water and started, then the cleaner ejects water to push the cleaner to move forward. Meanwhile, the trigger device 6 moves toward the direction opposite to the moving direction, and the Hall sensor gets out of the range of the magnet on the trigger device 6, so the Hall sensor is turned off. When meeting the pool wall, the trigger device 6 returns to the initial position under the action of the gravity, and the magnet on the trigger device 6 returns back to the position corresponding to the Hall sensor. Accordingly, the Hall sensor senses the magnetic field signal and is turned on. The cleaner ejects water in one opposite direction to push the cleaner to move backward, and the trigger device 6 moves toward the direction opposite to the moving direction, so the Hall sensor is turned off again. The cleaner moves away from the pool wall towards the pool wall at the opposite side. The cleaner repeats the above process to change the direction when meeting the pool wall to achieve the reciprocating motion of the cleaner.

Embodiment 3

Figure 6:
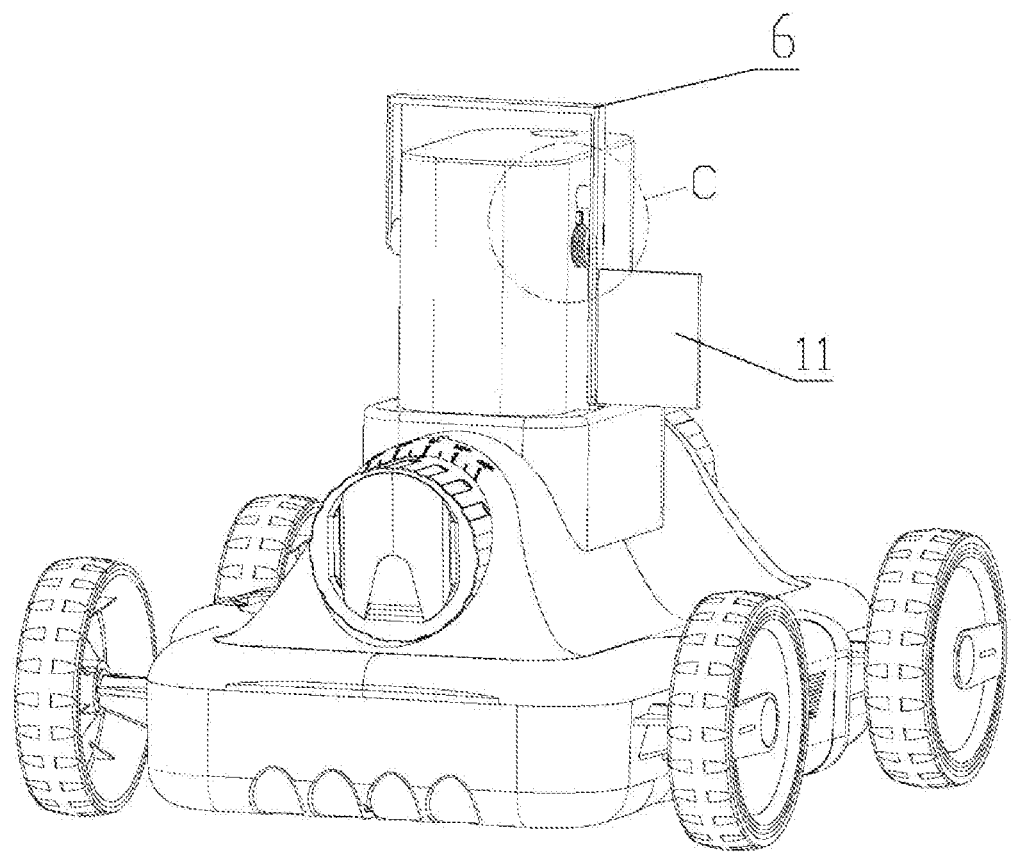
FIG. 6 is a structural schematic view of Embodiment 3 of the present disclosure.
Figure 7:
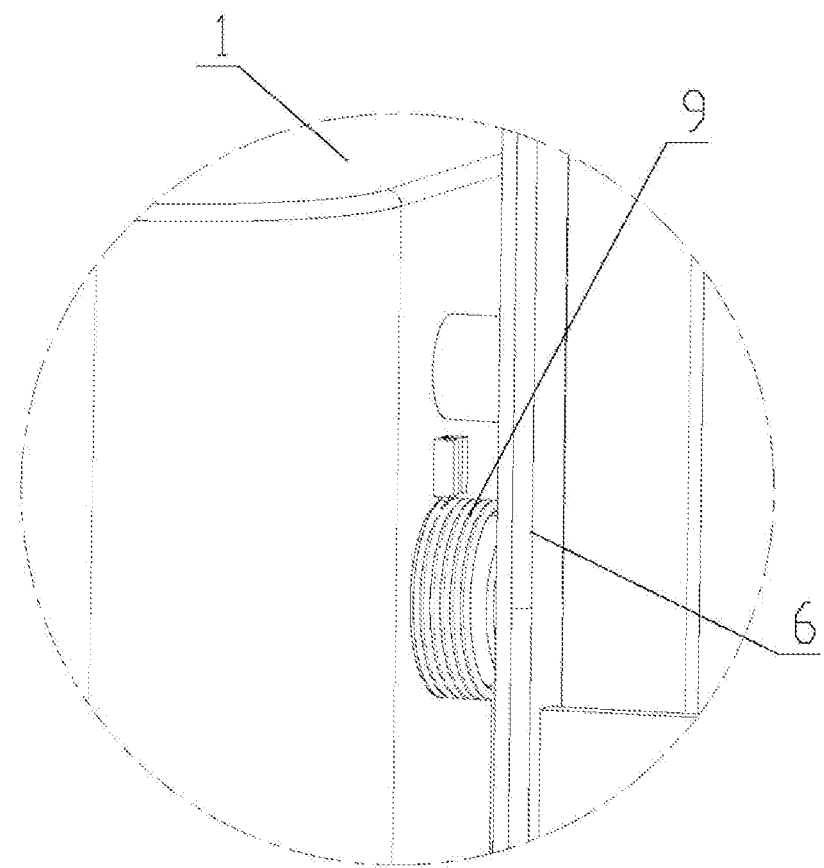
FIG. 7 is a partially enlarged view of part C in FIG. 6.

In the present embodiment, the obstacle touching detecting device of the swimming pool cleaner is similar to that of the embodiment 1 and the embodiment 2 in structure. Compared with the embodiment 1 and the embodiment 2, as shown in FIG. 6 and FIG. 7, the difference is that the trigger device 6 returns to the initial position under the action of a spring in the present embodiment.

In this embodiment, according to one of the technical solutions, the trigger device 6 is provided with one resistance plate 11, and the resistance plate 11 is located at one side of the pivoting shaft 5. For example, when the pivoting shaft is horizontally disposed, the resistance plate 11 may be located at the upper side or the lower side of the pivoting shaft 5. When the pivoting shaft is vertically disposed, the resistance plate 11 may be located at the left side or the right side of the pivoting shaft 5, etc. The selection depends on practical needs. According to the technical solution of the present embodiment, the pivoting shaft 5 is horizontally disposed, the resistance plate 11 is located below the pivoting shaft 5 and at the outer side of the pivoting arm. The size and surface structure of the resistance plate 11 and the elasticity of the spring match with the moving speed of the cleaner. The elastic member 9 is mounted between the pivoting arm and the housing of the cleaner main body 1. Here, the elastic member 9 is a torsion spring. One end of the elastic member 9 is fixedly mounted on the pivoting arm, and the other end of the elastic member is fixedly mounted on the cleaner main body 1, so that the resistance plate 11 can return to the initial position under the action of the torsion spring.

Figure 10:
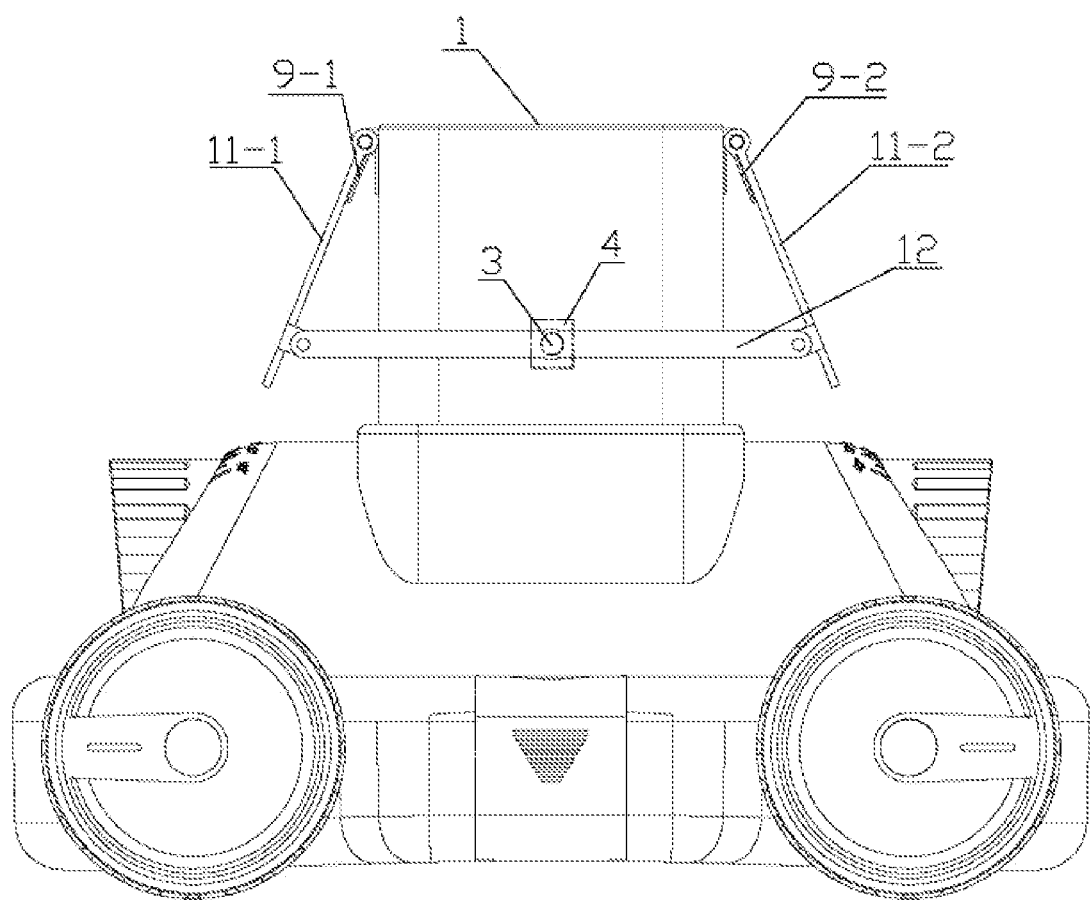
FIG. 10 is a schematic view showing the structure of two resistance plates and a connecting rod according to Embodiment 3 of the present disclosure.

Multiple trigger devices 6 may be provided, or multiple resistance plates 11 may be provided. The type and shape of the elastic member and the way to mount the elastic member may be of other forms. When two resistance plates 11 are provided, as shown in FIG. 10, the trigger device 6 is provided with two resistance plates. The resistance plate 11-1 and the resistance plate 11-2 are symmetrically mounted on two sides of the cleaner main body 1. One end of the resistance plate 11-1 and one end of the resistance plate 11-2 are mounted on the cleaner main body 1 through pivoting shafts. The elastic member 9-1 is installed between the resistance plate 11-1 and the housing of the cleaner main body 1. The elastic member 9-2 is installed between the resistance plate 11-2 and the housing of the cleaner main body 1. One end of the elastic member 9-1 is connected to the resistance plate 11-1, and the other end of the elastic member 9-1 is connected to the cleaner main body 1. The elastic member 9-2 is installed in the same way as the elastic member 9-1. Here, both of the elastic member 9-1 and the elastic member 9-2 are springs. Preferably, the elastic member 9-1 and the elastic member 9-2 are torsion springs. The rest end of the resistance plates 11-1 and the rest end of the resistance plates 11-2 are connected to each other by the connecting rod 12, so that the connecting rod 12 can move forward and backward together with the pivoting movement of the resistance plate 11-1 and the resistance plate 11-2. The magnet 3 is mounted on the middle position of the connecting rod 12, and the position of the magnet 3 is corresponding to the sensor detecting module 4. The working principle of this structure is the same as the above-mentioned structure with one resistance plate. The working process of the cleaner having this structure is as follows. When the cleaner moves in the swimming pool does the cleaning work, the resistance plate 11-2 on the front side in moving direction of the cleaner pivot toward the direction opposite to the moving direction of the cleaner under the resistance of the water, so that the elastic member 9-2 on the same side is compressed (i.e. the torsion spring is compressed) to drive the connecting rod 12 and the resistance plate 11-1 to move in the opposite direction. When the torque of the resistance of the water applied on the resistance plate 11-2 is equal to the torque of the elastic force of the elastic member 9-2, the resistance plate 11-2 and the connecting rod 12 are kept in balance. Namely, the entire trigger device 6 is kept in balance. Accordingly, the magnet 3 gets out of the range of the sensor detecting module 4 at the middle position (corresponding to the initial position of the motion path of the magnet 3) or moves to a position corresponding to the sensor detecting module at either of the two sides (corresponding to the position of the return point of the motion path of the magnet 3) to control the controller module 2 not to operate. Thus, the power-driven actuating device remains in its initial status, and the cleaner continues to move. When the cleaner touches the wall of the swimming pool, the moving speed of the cleaner jumps to zero, and the resistance of the water is reduced to zero. Accordingly, the resistance plate 11-2 returns to the initial position under the action of the elastic member 9-2 and drives the connecting rod 12 and the resistance plate 11-1 to return to the initial position. Meanwhile, the sensor detecting module 4 transmits a signal to the controller module 2, and the controller module 2 controls the power-driven actuating device to change the water ejecting direction, thereby changing the moving direction of the cleaner, vice versa. The working process of the resistance plate 11-1 is the same as that of the resistance plate 11-2, so as to achieve the automatic direction change of the cleaner.

Figure 11:
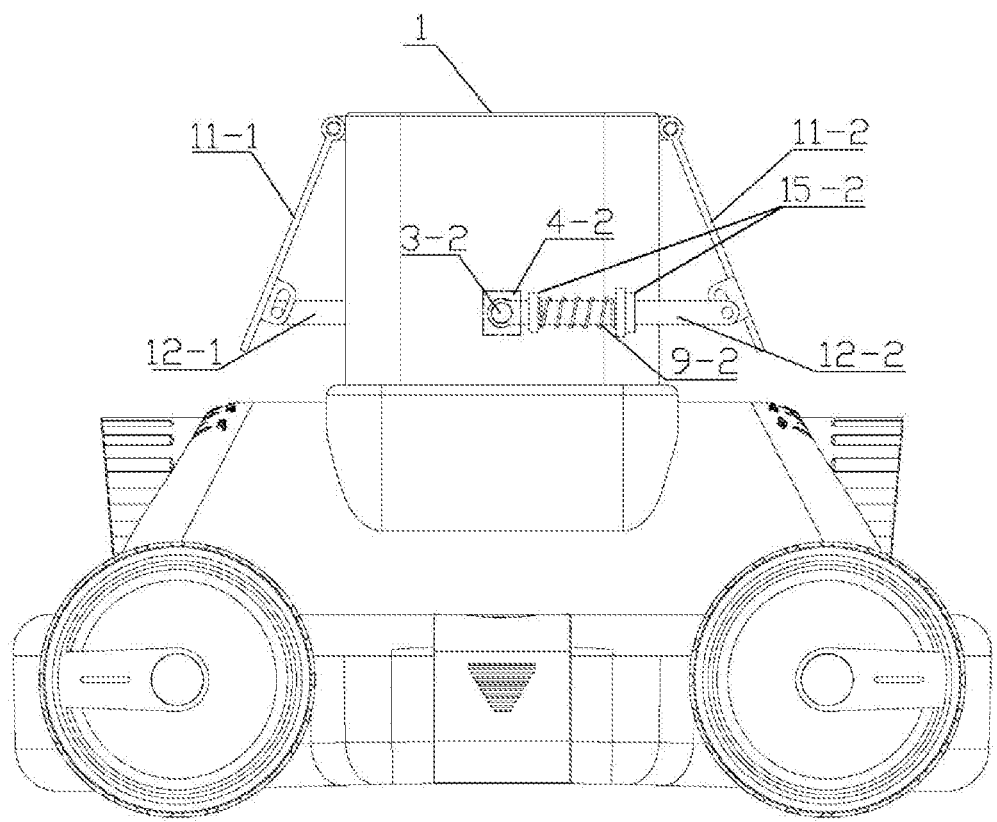
FIG. 11 is a schematic view showing the structure of two resistance plates and two connecting rods according to Embodiment 3 of the present disclosure.
Figure 12:
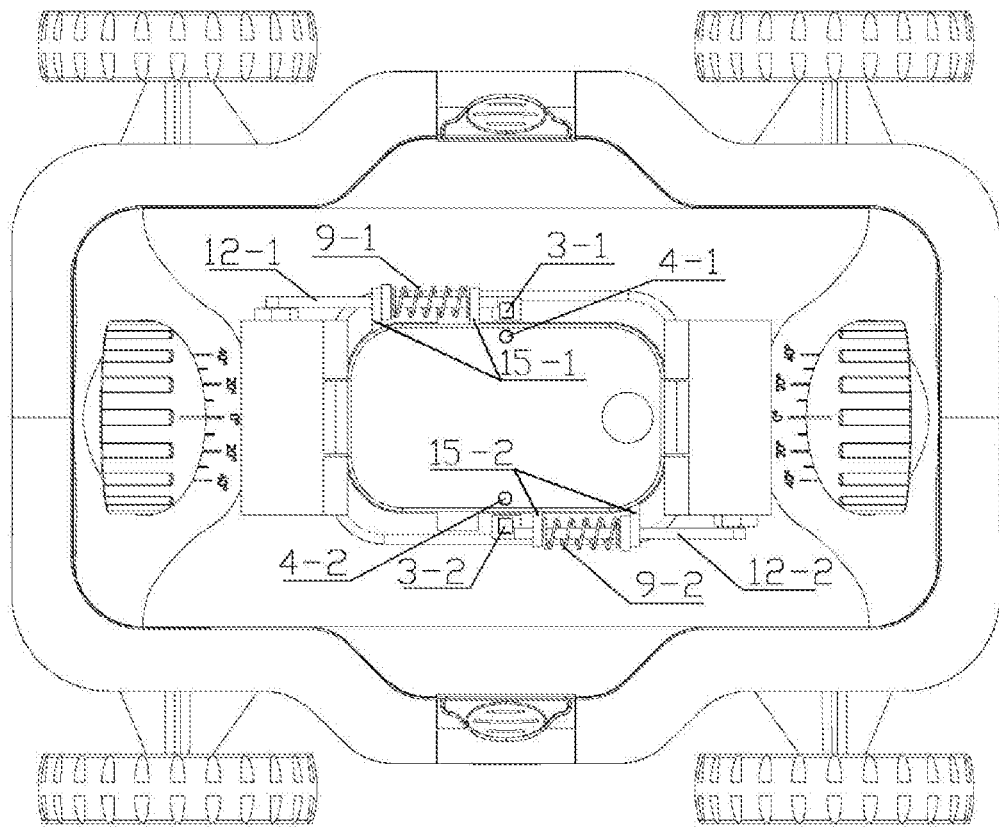
FIG. 12 is a top view of FIG. 11.

As a further improvement of the above structure, as shown in FIG. 11 and FIG. 12, two independent trigger devices having magnetic portions are provided, and sensor detecting modules are also provided, correspondingly. The two trigger devices includes the resistance plate 11-1 and the resistance plate 11-2, respectively. The resistance plate 11-1 and the resistance plate 11-2 are symmetrically mounted on two sides of the cleaner main body 1 at one end by the pivoting shaft and are able to move back and forth. The other end of the resistance plate 11-1 is connected to the connecting rod 12-1 through a slide slot, and the other end of the resistance plate 11-2 is connected to the connecting rod 12-2 through a slide slot. The connecting rod 12-1 and the connecting rod 12-2 are respectively mounted on the side walls of the cleaner main body 1 through the support frame 15-1 and the support frame 15-2. The connecting rod 12-1 and the connecting rod 12-2 are located on two sides of the cleaner main body 1. The connecting rod 12-1 and the connecting rod 12-2 can respectively reciprocate back and forth on the support frame 15-1 and the support frame 15-2. The elastic members are mounted on the portions of the connecting rod 12-1 and the connecting rod 12-2 on the support frames. Here, preferably, the elastic member is a compression spring. Here, each support frame has two holders. The holders are provided with through holes and are fixedly mounted on the side walls of the cleaner main body 1 at two sides. The ends of the connecting rod 12-1 and the connecting rod 12-2 away from the ends that are connected to the resistance plates respectively pass through the through holes of the support frame 15-1 and the support frame 15-2 to extend out of the support frames. The extending ends of the connecting rod 12-1 and the connecting rod 12-2 are respectively mounted with the magnet 3-1 and the magnet 3-2. Collaboratively, the initial positions at the middle are mounted with the Hall sensor 4-1 and the Hall sensor 4-2. The elastic member 9-1 and the elastic member 9-2 are respectively mounted on the connecting rod 12-1 and the connecting rod 12-2 between the support frames and the connecting rods. The resistance plates pivot to drive the connecting rods to move back and forth, so as to compress the elastic members and return to the initial position under the action of the elastic force of the elastic member. Therefore, the purpose to change the signal of the sensor detecting module is realized. That is to say, the signals of the Hall sensor 4-1 and the Hall sensor 4-2 can be separately changed to control the power-driven actuating device to operate and change the moving direction of the cleaner. Here, both of the elastic member 9-1 and the elastic member 9-2 are compression springs. The working process of the cleaner of this structure is as follows. As the cleaner moves in the swimming pool, the resistance plate 11-2 on the front side of the cleaner in the moving direction pivots toward the direction opposite to the moving direction under the resistance of the water, so that the connecting rod 12-2 is driven to move in the opposite direction, the elastic member 9-2 is compressed, and the magnet 3-2 moves away from the sensor detecting module (Hall sensor 4-2) at the middle position (which corresponds to the initial position of the motion path of the magnet 3-2) or approaches the sensor detecting module at the end position (which corresponds to the position of the return point of the motion path of the magnet 3-2). When the torque of the resistance of the water is equal to the torque of the elastic force of the elastic member 9-2, the resistance plate 11-2 is kept in balance. In this case, the magnet 3-2 gets out of the range of the sensor detecting module at the middle position or moves to a position corresponding to the sensor detecting module at the end position. Accordingly, the controller module 2 is controlled not to operate, the power-driven actuating device remains in its initial status, and the cleaner continues to move. When the cleaner touches the wall of the swimming pool, the moving speed of the cleaner jumps to zero, the resistance of the water decreases to zero, and the connecting rod 12-2 returns to the initial position under the action of the elastic force of the elastic member 9-2. Accordingly, the resistance plate 11-2 returns to the initial position, the magnet 3-2 returns to the middle position, and the Hall sensor 4-2 transmits the signal to the controller module 2. As a result, the controller module 2 controls the power-driven actuating device to operate to change the water ejecting direction, thereby changing the moving direction of the cleaner, vice versa. The working process of the resistance plate 11-1 is the same as that of the resistance plate 11-2, so as to achieve the automatic direction changing of the cleaner.

In this embodiment, the reciprocating motion of the trigger device 6 is achieved with the pivoting motion of the resistance plate. Alternatively, the pivoting shaft may not be provided, and the resistance plate is arranged to be in substantially vertical position (i.e., the normal line of the front surface of the resistance plate is consistent with the moving direction of the cleaner). Further, the resistance plate is connected to the housing of the cleaner main body 1 through a slide way. Thus, the resistance plate can also push the magnetic portion to reciprocate between the initial position and the return point, so as to achieve the same function described above.

Figure 13:
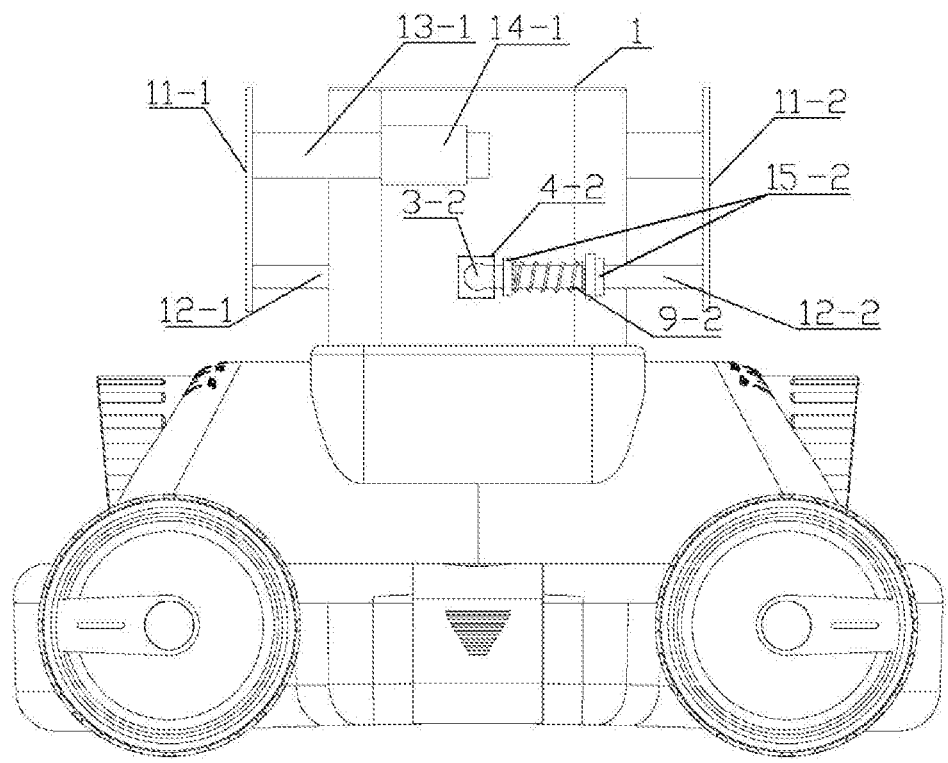
FIG. 13 is a schematic view showing another structure of two resistance plates and two connecting rods according to Embodiment 3 of the present disclosure.
Figure 14:
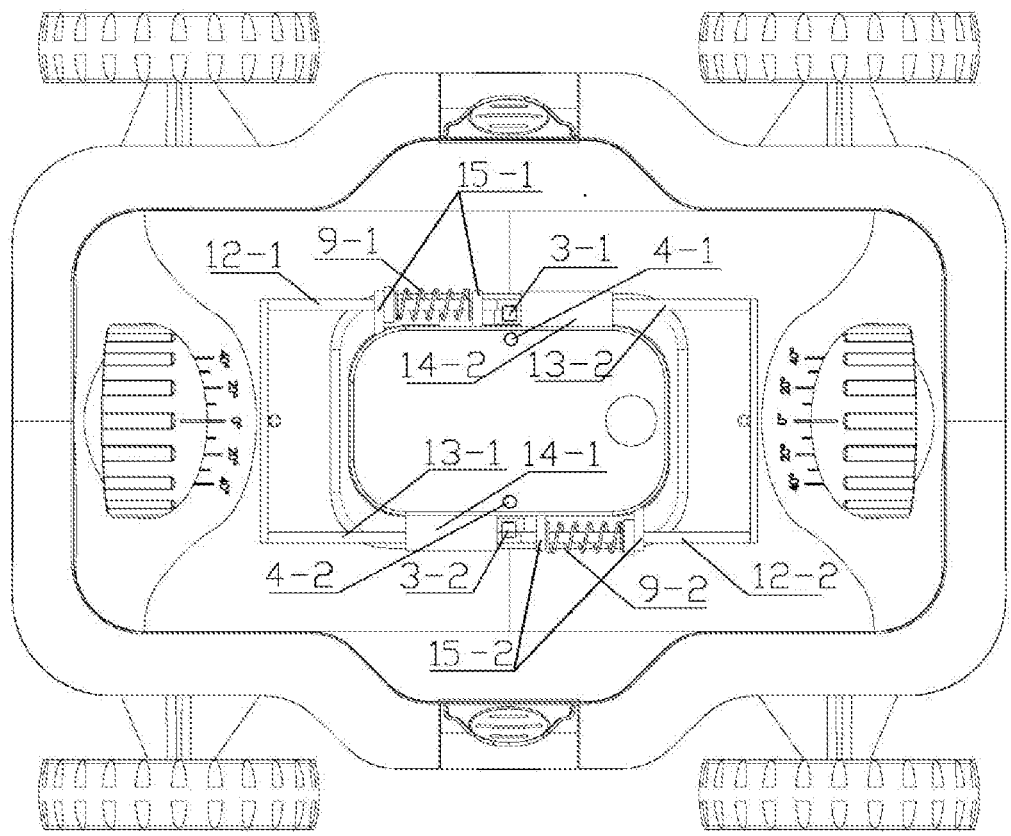
FIG. 14 is a top view of FIG. 13.

As shown in FIG. 13 and FIG. 14, the slide way 14-1 and the slide way 14-2 are mounted on two sides of the cleaner main body 1, and the support frame 15-1 and the support frame 15-2 are respectively mounted on two sides of the cleaner main body 1. The guide rod 13-1 is mounted on the slide way 14-1, and the guide rod 13-2 is mounted on the slide way 14-2. Further, the support frame 15-1 and the support frame 15-2 that are symmetrically arranged are respectively mounted with the connecting rod 12-1 and the connecting rod 12-2. The resistance plate 11-1 is mounted on the end of the guide rod 13-1 away from the slide way and the end of the connecting rod 12-1 away from the support frame 15-1. The resistance plate 11-2 is mounted on the end of the guide rod 13-2 away from the slide way and the end of the connecting rod 12-2 away from the support frame 15-2. The spring 9-1 is mounted on the connecting rod 12-1 between connecting rod 12-1 and the support frame, and the magnet 3-1 is mounted on the end of connecting rod 12-1 where the connecting rod 12-1 extends through the through holes of the two holders of support frame 15-1. The spring 9-2 is mounted on the connecting rod 12-2 between connecting rod 12-2 and the support frame, and the magnet 3-2 is mounted on the end of connecting rod 12-2 where the connecting rod 12-2 extends through the through holes of the two holders of support frame 15-2. Therefore, the connecting rod 12-1 and the guide rod 13-1 can reciprocate back and forth simultaneously, and the connecting rod 12-2 and the guide rod 13-2 can reciprocate back and forth simultaneously, so as to achieve the back-and-forth reciprocating motion of the resistance plate 11-1 and the resistance plate 11-2. The working process of the trigger device with this structure is as follows. As the cleaner moving in the swimming pool, the resistance plate 11-2 moves toward the direction opposite to the moving direction under the resistance of the water. Namely, the resistance plate 11-2 moves backward. With the guiding function of the support frame, the connecting rod 12-2 moves backward. Meanwhile, with the guiding function of slide way 14-2, the guide rod 13-2 moves backward. The connecting rod 12-2 and the guide rod 13-2 move simultaneously to compress the spring 9-2. The connecting rod 12-2 moves backward together with the magnet 3-2 to move away from the sensor detecting module (Hall sensor 4-2) at the middle position or approach the sensor detecting module at the end position. When the rebound force of the spring 9-2 is equal to the resistance of the water applied on the resistance plate 11-2, the resistance plate 11-2 is kept in balance. The magnet 3-2 moves away from the sensor detecting module (the Hall sensor 4-2) at the middle position or moves to the end position corresponding to the sensor detecting module. In this case, the controller module 2 does not operate, the power-driven actuating device remains in its initial status, and the cleaner continues to move. When the cleaner touches the wall of the swimming pool, the moving speed of the cleaner jumps to zero, and the resistance of the water decreases to zero. Accordingly, the connecting rod 12-2 and the guide rod 13-2 returns to the initial position under the action of the elastic member 9-2, the resistance plate 11-2 returns to the initial position, and the magnet 3-2 also returns to the position at the middle. Thus, the Hall sensor 4-2 is turned on and transmits the signal to the controller module 2. The controller module 2 controls the power-driven actuating device to operate to change the water ejecting direction, thereby changing the moving direction of the cleaner, vice versa. The working process of the resistance plate 11-1 is the same as that of the resistance plate 11-2, so as to achieve the automatic direction changing of the cleaner.

Here, only two types of connection between the trigger device and the cleaner main body 1 are described, while other methods may also be acceptable according to the practical applications which are not described in detail herein.

In addition, the entire trigger device 6 or a part of the trigger device 6 may also be integrally formed by an elastic material and fixedly mounted on the cleaner main body. The above motions can be completed without configuring a spring on the trigger device 6, separately. As the cleaner moving forward in the swimming pool, under the resistance of the water, the trigger device 6 is elastically strained in the direction opposite to the moving direction. When the resistance of the water is equal to the rebound force against the elastic deformation of the trigger device 6, the trigger device 6 is kept in balance. When the cleaner touches the wall, the resistance of the water is zero, and the trigger device 6 returns to the initial position under the action of the elastic rebound force. Accordingly, the sensor detecting module is triggered to operate and transmit the detection signal to the controller module, so the controller module controls the power-driven actuating device to operate to change the direction of the cleaner, and vice versa. Therefore, the reciprocating motion of the cleaner is realized.

The working process of this embodiment is as follows. The cleaner is first put into the water and started, and then the cleaner ejects water to push the cleaner to move forward. Accordingly, the trigger device moves backward or the trigger device at the front side moves backward under the resistance of the water, the magnet on the trigger device gets out of the range of the Hall sensor, and the Hall sensor is turned off. When the cleaner touches the wall, the trigger device returns to the initial position, and the magnet on the trigger device returns to the position near the Hall sensor. In this case, the Hall sensor senses the magnetic field signal and is turned on, and the cleaner ejects water in the opposite direction to push the cleaner to move backward. Accordingly, the trigger device moves toward the direction opposite to the moving direction or the trigger device at the front side in the moving direction moves toward the direction opposite to the moving direction under the resistance of the water, and the Hall sensor is turned off again. The cleaner leaves the pool wall and moves toward the pool wall at the opposite side. When meeting the pool wall again, the processes of changing direction described above are repeated, so as to achieve the reciprocating motion of the cleaner.

When the sensor detecting module is a photoelectric sensor, the trigger device is identical to the embodiment 1, embodiment 2, and embodiment 3 in structure. The difference is that the magnetic portion is not provided in this embodiment, and the trigger portion of the trigger unit is an optical component. Here, the optical component may be a retroreflector or a shade plate, the selection depends on the type of photoelectric sensor selected. Like the magnetic portion, the optical component may be integrally formed with the trigger device or be separately disposed on the trigger device, and the working process is the same as that of the embodiment 1, embodiment 2, and embodiment 3. The difference is that the photoelectric sensor senses optical signals. According to the working processes of the embodiment 1, embodiment 2, and embodiment 3, the trigger device moves together with the optical component, and the change of the optical signal occurs at the position where the photoelectric sensor works collaboratively with optical component. The photoelectric sensor converts the change of the optical signal into the change of the electrical signal, and further transmits the change of the electrical signal to the controller module 2 to control the actuating device to operate, and therefore controls the operation of the cleaner and changes the moving direction of the cleaner. The working process is the same as that in the embodiment 1, embodiment 2, and embodiment 3, so the details will not be repeated herein.

The following description is based on the case where one Hall sensor is provided in Embodiment 1. After replacing the Hall sensor with a photoelectric sensor, the structure and working process of an obstacle touching detecting device of the swimming pool cleaner are as follows.

Figure 15:
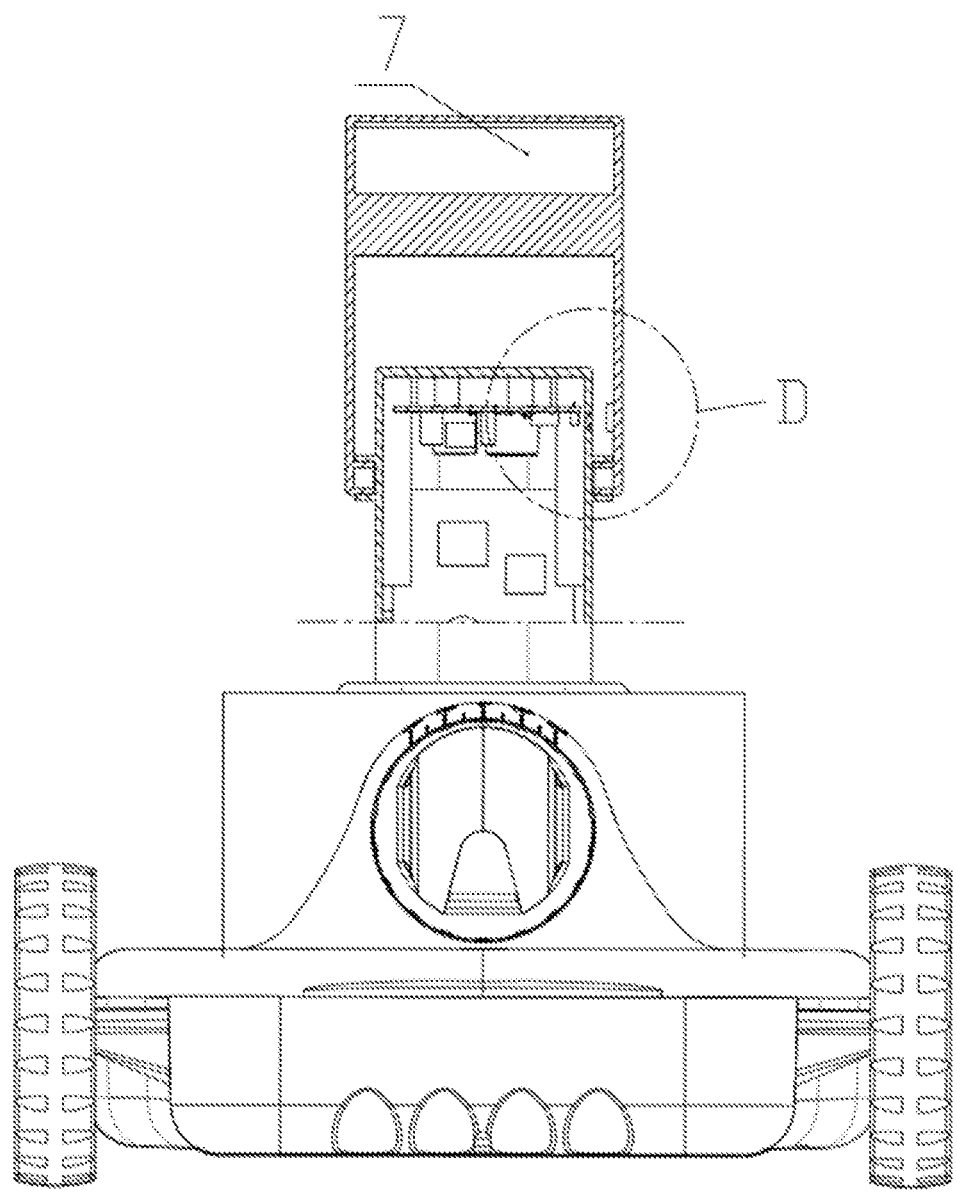
FIG. 15 is a schematic view showing the structure of the cleaner with a reflective photoelectric sensor according to the present disclosure.
Figure 16:
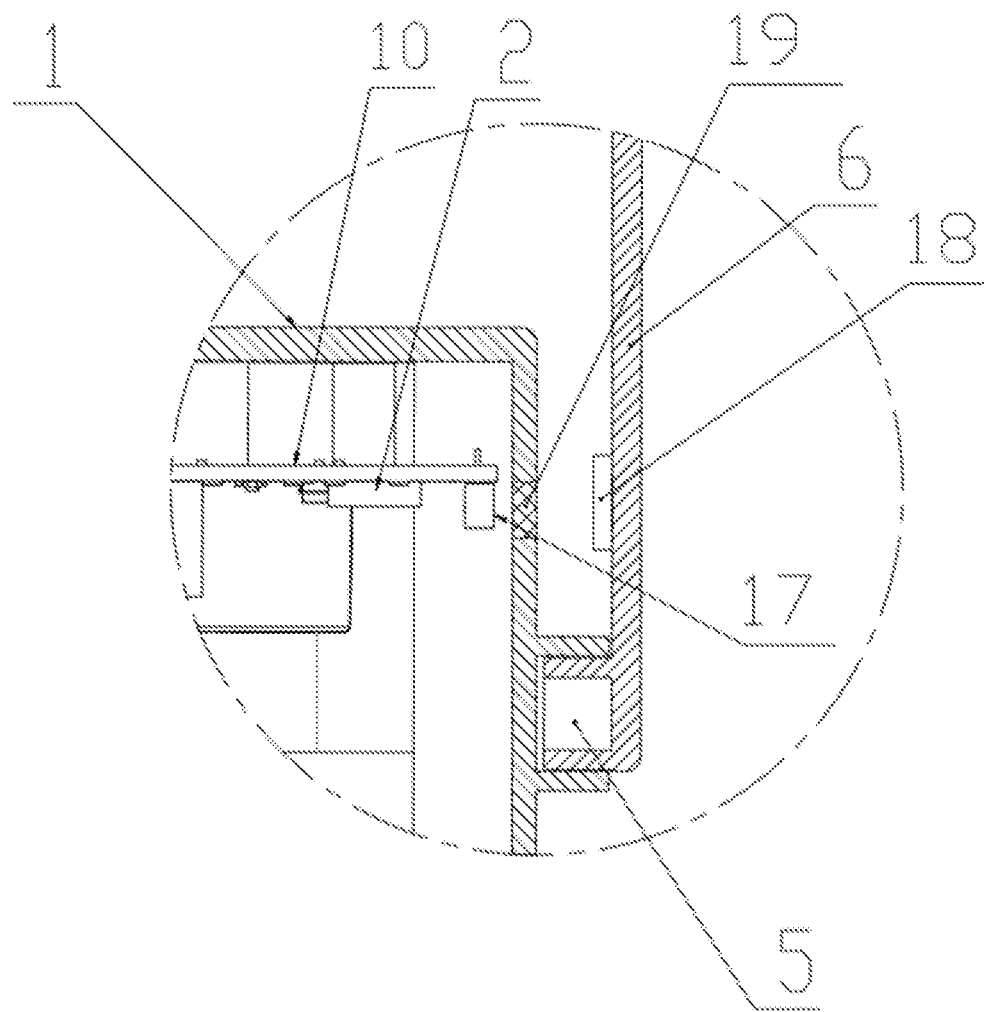
FIG. 16 is a partially enlarged view of part D in FIG. 15.

As shown in FIGS. 15 and 16, the photoelectric sensor is the retro-reflective photoelectric sensor 17, and the optical component is the retroreflector 18. The retroreflector 18 is fixedly installed on the trigger device 6, the retro-reflective photoelectric sensor 17 is installed on the circuit board 10, and the position of the retroreflector 18 corresponds to the installation position of the retro-reflective photoelectric sensor 17. The transparent sealing plate 19 is fixedly installed at the position corresponding to the retro-reflective photoelectric sensor 17 on the cleaner main body 1. The retroreflector 18 reflects the light signal emitted by the retro-reflective photoelectric sensor 17. The retro-reflective photoelectric sensor 17 converts the reflected light signal into an electrical signal and transmits the electrical signal to the controller module 2 to control the actuating device to operate, thereby changing the moving direction of the cleaner. When no reflected light is reflected on the retro-reflective photoelectric sensor 17, the cleaner keeps the original moving direction unchanged.

Figure 17:
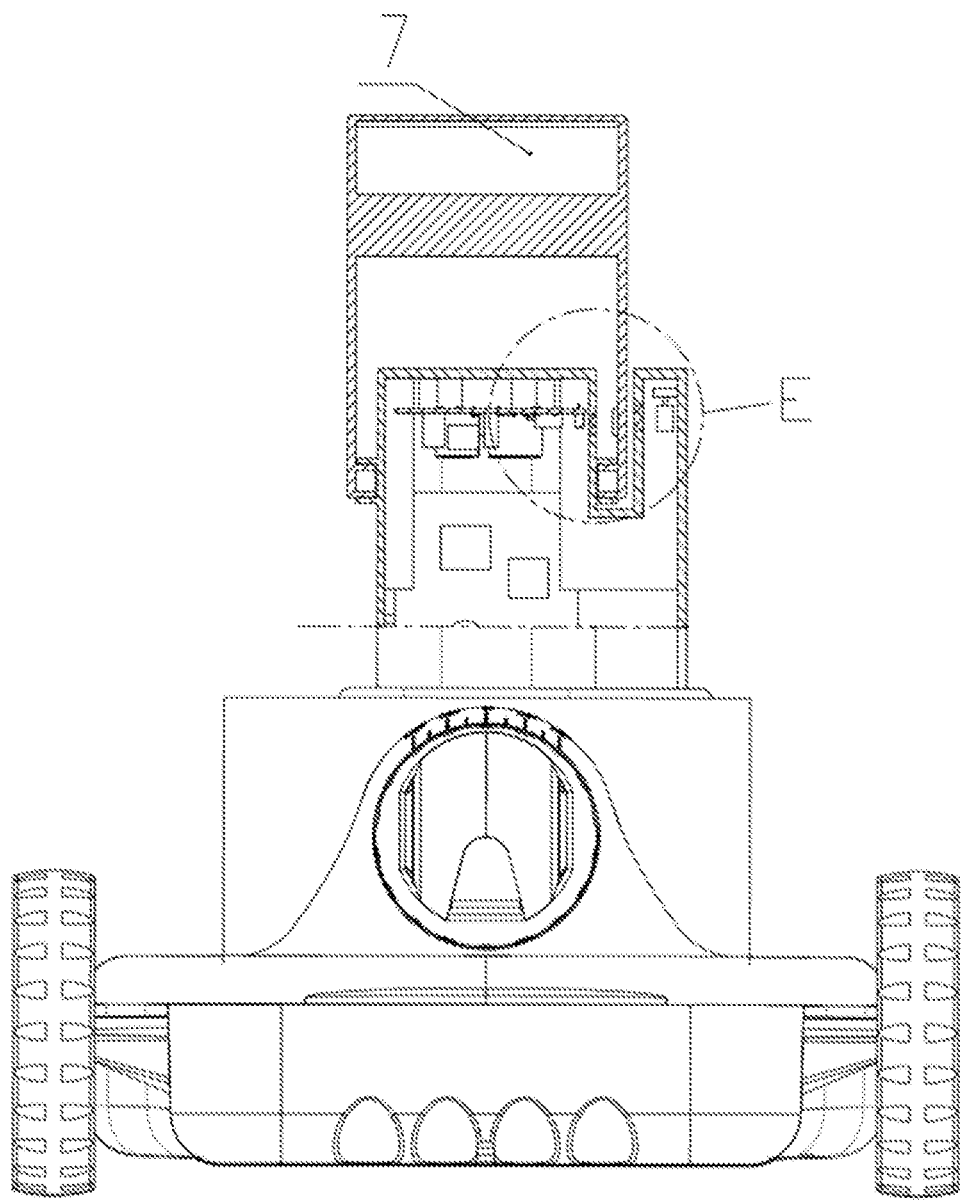
FIG. 17 is a schematic view showing the structure of the cleaner with a through-beam photoelectric sensor according to the present disclosure.
Figure 18:
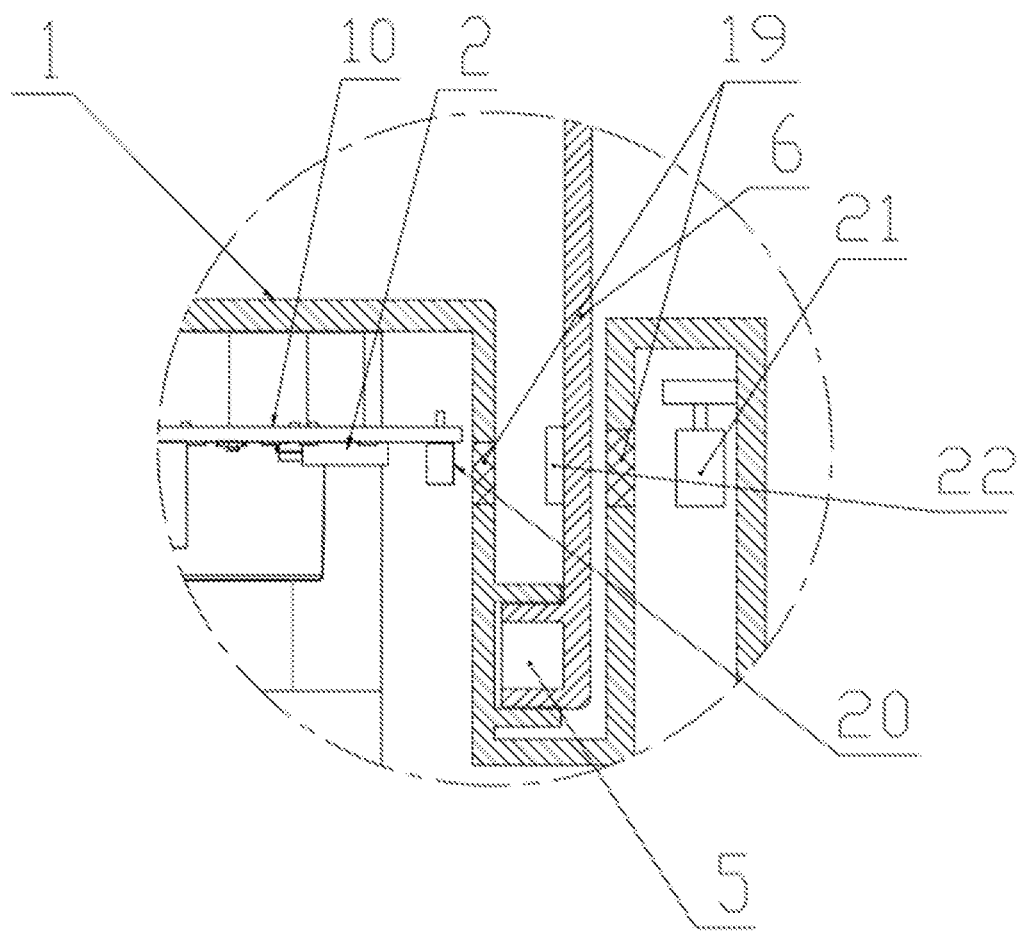
FIG. 18 is a partially enlarged view of part E in FIG. 17.

Alternatively, as shown in FIGS. 17 and 18, the photoelectric sensor is the through-beam photoelectric sensor, the optical component is the shade plate 22. The through-beam photoelectric sensor includes the receiver element 21 and the emitter element 20. The emitter element 20 is installed on the circuit board 10, the receiver element 21 is installed in the sealing portion inside the cleaner body 1, and the position of the emitter element 20 corresponds to the position of the receiver element 21. The transparent sealing plate 19 is fixedly installed at the position corresponding to the emitter element 20 and the receiver element 21 on the cleaner body 1. The emitter element 20 emits an optical signal, and the receiver element 21 receives the optical signal, converts the received signal into an electrical signal, and then transmits the electrical signal to the controller module 2. When the receiver element 21 has been receiving the signal emitted by the emitter element 20, it indicates that the swimming pool cleaner has been walking. When the receiver element 21 cannot receive the signal emitted by the emitter element 20 due to the blocking of the shade plate 22, it indicates that the swimming pool cleaner touches the wall, and then the controller module 2 controls the swimming pool cleaner to change direction.

The structure and working process of the other embodiments enumerated in Embodiment 1, Embodiment 2 and Embodiment 3 can be analogous to the above description when using the photoelectric sensor, so the details will not be repeated herein.

The three embodiments described above further illustrate the specific implementations of the technical solutions of the present disclosure, which are only based on the situation where the controller module is arranged in the sealing portion inside the cleaner main body. In the case where the controller module is arranged outside the cleaner main body, the sensor detecting module and the controller module are electrically connected by wires or the like. The working principle is the same, so the details will not be repeated herein.

According to the above detailed description of the three embodiments of the present disclosure, the cleaner is propelled by water ejection, and the cleaner may also be propelled by other means (e.g., propelled by the transmission) and achieve the obstacle detecting function by using the same or similar structure of the present disclosure. The working principle is the same, and the details will not be repeated herein.

The present disclosure has the following advantages and feats. By adopting the above technical solutions, the swimming pool cleaner has a more compact structure and an obstacle touching detecting device which can automatically detect when the cleaner touches the pool wall or other obstacles and can control the cleaner to change direction automatically. Thus, the cleaner is simple and compact in structure, flexible in movement, and capable of cleaning the swimming pool independently and efficiently. Since the swimming pool cleaner has an obstacle touching detecting device, the obstacle touching behavior can be detected when doing the cleaning work, and the moving direction can be automatically changed. The obstacle touching detecting device employs the sensors for detection, and the operation state of the motor of the cleaner is controlled by the controller module, so as to change the moving direction of the cleaner. Accordingly, the cleaner can accurately detect whether the cleaner touches the wall or not and change the moving direction when cleaning the swimming pool. Therefore, the cleaner can work flexibly and avoid the efficiency loss caused by the mode of controlling according to time, which is especially useful for the battery-powered swimming pool cleaner. The obstacle touching detecting device is the Hall sensor and a trigger device having a magnetic portion which works collaboratively with the Hall sensor is provided. Alternatively, the obstacle touching detecting device may be the photoelectric sensor and the trigger device having the optical component which works collaboratively with the photoelectric sensor is provided. Thus, these types of obstacle touching detecting devices can quickly detect the obstacle touching behavior of the cleaner, has simple structure, rapid response, accuracy, flexible motion, and can meet the needs of use.

The three embodiments of the present disclosure are described in detail above, but the disclosure merely includes some of the preferred embodiments of the present invention which cannot be considered as limiting the implementation scope of the present disclosure. All equivalent changes and improvements made without departing from the scope of the present application should be considered as falling within the scope of the present disclosure.

What is claimed is:

1. An underwater pool cleaner propelled by water ejection, comprising:
   a main functional portion and an obstacle detecting device, wherein
   during running, the underwater pool cleaner ejects water in a water ejecting direction to push the underwater pool cleaner to move in a moving direction;
   the obstacle detecting device is disposed on the main functional portion of the pool cleaner,
   wherein the obstacle detecting device comprises:
      a trigger unit comprising a trigger device having at least one resistance plate pivotably connected to the main functional portion via a pivot shaft, and wherein during movement of the underwater pool cleaner, water pushes the at least one resistance plate in an opposite direction from the moving direction and maintains a position of a constant pivoting angle of the at least one resistance plate and the trigger device relative to an initial position and when the underwater pool cleaner touches an obstacle a speed of the underwater pool cleaner becomes zero and resistance of the water on the at least one resistance plate becomes zero whereby the trigger device, having the at least one resistance plate, returns to the initial position, and
   wherein the main functional portion of the pool cleaner comprises:
      a cleaner main body, a controller module, and a power-driven actuating device, wherein the controller module and the power-driven actuating device are connected to the cleaner main body, and the controller module is electrically connected to the power-drive actuating device; and
   wherein the controller module receives a detection signal of the obstacle detecting device, controls the power-driven actuating device to operate, changes the water ejecting direction of the underwater pool cleaner, and further changes the moving direction of the underwater pool cleaner.

2. The underwater pool cleaner of claim 1, wherein at least one detector is provided.

3. The underwater pool cleaner of claim 2, wherein
   the trigger device comprises a trigger portion,
   the trigger portion moves relative to the cleaner main body, and
   a position of the at least one detector matches with a position of a feature point of a motion path of the trigger portion.

4. The underwater pool cleaner of claim 3, wherein the trigger portion reciprocates relative to the cleaner main body.

5. The underwater pool cleaner of claim 4, wherein,
   the position of the feature point of the motion path of the trigger portion comprises an initial position of the motion path and a returning position of the motion path.

6. The underwater pool cleaner of claim 3, wherein
   the position of the feature point of the motion path of the trigger portion comprises an initial position of the motion path and a returning position of the motion path.

7. The underwater pool cleaner of claim 6, wherein
   the position of the at least one detector matches with the initial position of the motion path or the returning position of the motion path.

8. The underwater pool cleaner of claim 4, wherein the trigger portion is capable of generating a magnetic field.

9. The underwater pool cleaner of claim 8, wherein the trigger portion is a magnet.

10. The underwater pool cleaner of claim 8, wherein the at least one detector is a Hall sensor.

11. The underwater pool cleaner of claim 3, wherein the trigger portion is an optical component, and the optical component is a retroreflector or a shade plate.

12. The underwater pool cleaner of claim 11, wherein the at least one detector is a photoelectric sensor.

13. The underwater pool cleaner of claim 3, wherein the trigger unit comprises a buoyancy chamber.

14. The underwater pool cleaner of claim 13, wherein the buoyancy chamber is internally provided with a buoyant material or air.

15. The underwater pool cleaner of claim 3, wherein the trigger unit comprises a block, and a density of the block is greater than a density of a pool water.

16. The underwater pool cleaner of claim 3, wherein the trigger unit comprises an elastic member.

17. The underwater pool cleaner of claim 16, wherein the elastic member is a spring.

18. The underwater pool cleaner of claim 2, wherein the at least one detector is a Hall sensor.

19. The underwater pool cleaner of claim 2, wherein the at least one detector is a photoelectric sensor.

20. The underwater pool cleaner of claim 1, wherein the pivot shaft is connected to mounting bushings on either side of the main functional portion.

\* \* \* \* \*